United States Patent
Takeoka et al.

(10) Patent No.: US 10,637,377 B2
(45) Date of Patent: Apr. 28, 2020

(54) MOTOR DRIVING DEVICE, AS WELL AS REFRIGERATOR AND DEVICE FOR OPERATING COMPRESSOR IN WHICH SAID MOTOR DRIVING DEVICE IS USED

(71) Applicant: Panasonic Intellectual Property Management Co., Ltd., Osaka-shi, Osaka (JP)

(72) Inventors: Yoshinori Takeoka, Shiga (JP); Hidehisa Tanaka, Shiga (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/897,587

(22) Filed: Feb. 15, 2018

(65) Prior Publication Data
US 2018/0175752 A1 Jun. 21, 2018

Related U.S. Application Data

(63) Continuation of application No. PCT/JP2016/003696, filed on Aug. 10, 2016.

(30) Foreign Application Priority Data

Aug. 28, 2015 (JP) .................... 2015-168579
Aug. 28, 2015 (JP) .................... 2015-168580
(Continued)

(51) Int. Cl.
*H02P 6/182* (2016.01)
*F25B 49/02* (2006.01)
(Continued)

(52) U.S. Cl.
CPC ............ *H02P 6/182* (2013.01); *F25B 49/02* (2013.01); *H02M 7/53871* (2013.01);
(Continued)

(58) Field of Classification Search
CPC .. H02P 6/182; H02P 6/20; F25B 49/02; F25B 2500/26; H02M 7/53871
See application file for complete search history.

(56) References Cited

U.S. PATENT DOCUMENTS

2002/0030462 A1   3/2002   Matsushiro et al.
2004/0227482 A1*  11/2004  Yoshida ............... B60H 1/3222
                                              318/437
(Continued)

FOREIGN PATENT DOCUMENTS

CN   104079219 A   10/2014
EP   0 734 115 A1   9/1996
(Continued)

OTHER PUBLICATIONS

The partial supplementary European search report (R.164 EPC) dated Jul. 30, 2018 for the related European Patent Application No. 16841065.2, 14 pages.
(Continued)

*Primary Examiner* — Cortez M Cook
(74) *Attorney, Agent, or Firm* — Hamre, Schumann, Mueller & Larson, P.C.

(57) ABSTRACT

A motor driving device includes: brushless DC motor (5) that drives a load that fluctuates during one rotation; and driver (9) that applies a voltage to brushless DC motor (5) and drives brushless DC motor (5). The motor driving device further includes speed accelerator (8) that determines the voltage to be applied by driver (9) so as to accelerate brushless DC motor (5) such that a speed change rate of a speed within one rotation from start of brushless DC motor (5) with respect to a speed at next one rotation remains within a predetermined value or less.

4 Claims, 21 Drawing Sheets

(30) Foreign Application Priority Data

Aug. 28, 2015 (JP) ................................. 2015-168581
Aug. 28, 2015 (JP) ................................. 2015-168592

(51) Int. Cl.

| | | |
|---|---|---|
| H02M 7/53 | (2006.01) | |
| H02P 6/20 | (2016.01) | |
| H02M 7/5387 | (2007.01) | |
| H02P 6/16 | (2016.01) | |

(52) U.S. Cl.

CPC ............ *H02P 6/20* (2013.01); *F25B 2500/26* (2013.01); *F25B 2500/27* (2013.01); *F25B 2600/2513* (2013.01); *H02P 6/16* (2013.01); *H02P 2207/05* (2013.01)

(56) References Cited

U.S. PATENT DOCUMENTS

| | | |
|---|---|---|
| 2006/0290312 A1 | 12/2006 | Nagai et al. |
| 2008/0072619 A1 | 3/2008 | Nojima et al. |
| 2009/0167220 A1* | 7/2009 | Kanamori ................. H02P 6/20 318/400.11 |
| 2013/0169204 A1 | 7/2013 | Kuboe |
| 2014/0049201 A1* | 2/2014 | Hirono .................... H02P 1/166 318/400.23 |
| 2014/0285127 A1 | 9/2014 | Kang et al. |

FOREIGN PATENT DOCUMENTS

| | | |
|---|---|---|
| JP | 10-028395 | 1/1998 |
| JP | 11-164584 A | 6/1999 |
| JP | 2002-095283 A | 3/2002 |
| JP | 2006-254626 A | 9/2006 |
| JP | 2008-099483 A | 4/2008 |
| JP | 2008-104337 | 5/2008 |
| JP | 2010-252406 | 11/2010 |
| JP | 2013-121278 A | 6/2013 |

OTHER PUBLICATIONS

"Motor/Inverter Technology for Home Appliance (original title is in Japanese)", edited and written by Nagatake Kazuo, published by The Nikkan Kogyo Shimbun, Ltd., Apr. 28, 2000, pp. 88-91—with translation.

Chinese Search Report dated Feb. 3, 2020 for the related Chinese Patent Application No. 201680046997.1.

\* cited by examiner

MOTOR DRIVING DEVICE, AS WELL AS REFRIGERATOR AND DEVICE FOR OPERATING COMPRESSOR IN WHICH SAID MOTOR DRIVING DEVICE IS USED

TECHNICAL FIELD

The present invention relates to a motor driving device that drives a brushless DC motor, as well as a refrigerator and a device for operating a compressor in which the motor driving device is used.

BACKGROUND ART

Conventionally, a motor driving device of this type drives a motor under pulse width modulation (PWM) control as follows. If a driving speed of the motor is higher than a target speed, the device reduces an ON time of PWM, whereas if the driving speed of the motor is lower than the target speed, the device increases the ON time.

Moreover, in a refrigerator that performs a cooling operation by using a conventional motor driving device, a four-way valve is provided in a refrigeration cycle. When the compressor is operated, the four-way valve is operated by a normal refrigeration cycle. When the compressor is stopped, the four-way valve is switched such that a high pressure side and low pressure side are separated from each other on the cycle, that a high-pressure refrigerant is supplied from a dryer to the compressor, and that a pressure difference between suction and discharge of the compressor becomes small. This configuration prevents the refrigerant on the high-pressure side from flowing into an evaporator at the time of stoppage of the compressor and keeps a temperature of the evaporator low to prevent a rise in refrigerator temperature, thereby achieving energy saving in the refrigerator (see, for example, PTL 1).

Moreover, in general, the motor is driven as follows at the time of starting the motor. That is, the motor is started while sequentially switching predetermined patterns of an applied voltage to the motor in a predetermined cycle. Then, when a rotation speed of the motor reaches a set rotation speed, the patterns of the applied voltage to the motor are switched for control that is based on position detection such as detection of a magnetic pole position of the motor, and then the motor is driven (see, for example, PTL 2).

FIG. 17 shows an internal configuration of a refrigerator using the conventional motor driving device described in PTL 1.

As shown in FIG. 17, in the conventional refrigerator, a refrigeration cycle is formed of low-pressure shell compressor 101, condenser 102, dryer 103, capillary tube 104 and evaporator 105 in this order. The refrigerant flows in the refrigeration cycle from compressor 101 to condenser 105.

Four-way valve 106 connects inlet A and the dryer 103 to each other, connects outlet B and capillary tube 104 to each other, connects inlet C and evaporator 105 to each other, and connects outlet D and compressor 101 to each other. During operation of compressor 101, four-way valve 106 causes inlet A to communicate with outlet B, and causes inlet C to communicate with outlet D. Moreover, during stoppage of compressor 101, four-way valve 106 causes inlet A to communicate with outlet D, and causes inlet C to communicate with outlet B. This forms: a closed circuit in a high-pressure area provided with compressor 101, condenser 102 and dryer 103; and a closed circuit in a low-pressure area provided with capillary tube 104 and evaporator 105 during the stoppage of compressor 101.

During a refrigeration cycle operation, a normal refrigeration cycle is formed to enable a regular cooling operation. Moreover, at the time of stoppage of the refrigeration cycle, compressor 101 can be started in a state in which the high pressure side and the low pressure side are separated from each other on the cycle, the high-pressure refrigerant is supplied from the dryer to the compressor 101, the pressure difference between suction and discharge of compressor 101 is reduced, and load torque fluctuations are small. This configuration prevents the high-pressure side refrigerant from flowing into evaporator 105 and the rise in temperature of evaporator 105 during the stoppage of the refrigeration cycle. This makes it possible to reduce a loss of energy in the refrigeration cycle.

However, in such a configuration of the refrigerator using the conventional motor driving device as shown in PTL 1 and PTL 2, the motor driving device cannot cope with large load torque fluctuations at the time of starting, vibrations increase, and the reliability of compressor 101 decreases. Therefore, in order to stably start compressor 101, it is necessary to balance a suction pressure and discharge pressure of compressor 101 by using four-way valve 106 when compressor 101 is stopped. As a result, there is a problem that a system becomes complicated and cost also increases.

Moreover, the conventional motor driving device and the refrigerator using the same are configured to detect a rotational position of a rotor of the brushless DC motor and to switch a stator winding to be energized based on the rotational position thereof. In drive of the brushless DC motor in a special environment such as a compressor, for the detection of the rotational position of the rotor, a detector such as an encoder and a Hall element is not used, but in general, there is used a digital sensorless mode for comparing an inverter output voltage and ½ of an inverter input voltage with each other and detecting a point where a magnitude relationship therebetween changes (for example, see NPL 1).

FIG. 18 shows a block diagram of a motor driving device of NPL 1.

In FIG. 18, the conventional motor driving device uses commercial power source 181 as an input, converts an alternating current (AC) voltage into a direct current (DC) voltage by a rectifying/smoothing circuit 182, and inputs the DC voltage to inverter 183. In inverter 183, six switching elements 183a to 183f are connected to one another in the form of a three-phase full bridge, and diodes 183g to 183l are respectively connected in parallel in an opposite direction to switching elements 183a to 183f. In this way, inverter 183 converts the DC input into three-phase AC power and supplies the power to brushless DC motor 184. Position detection circuit 185 detects a relative position of the rotor based on terminal voltages of brushless DC motor 184.

FIG. 19 is a circuit diagram of position detection circuit 185 of the motor driving device of NPL 1.

In FIG. 19, position detection circuit 185 in NPL 1 is composed of comparator 186 realized by comparators. The terminal voltages of brushless DC motor 184 are input to non-inverting inputs of comparator 186, and a voltage of ½ of the inverter input voltage is input as a reference voltage to inverting inputs of comparator 186. For a position signal, with regard to an induced voltage appearing at such an inverter output terminal in a non-energized phase in the stator winding, timing at which a magnitude relationship of the induced voltage with the reference voltage changes (that is, a zero-cross point of the induced voltage) is detected, and a detection result is output.

FIG. 20 is a diagram showing waveforms including current waveform A and terminal voltage waveform B at a time of sensorless driving of the motor driving device according to NPL 1. It is graph C that shows a comparison result showing a magnitude relationship of terminal voltage waveform B with the reference voltage (½ voltage of the inverter input). Output waveform D of position detection circuit 185 is a waveform obtained by removing an influence of switching by PWM control and an influence of spike voltage X and spike voltage Y from such a waveform C by waveform processing. Here, spike voltage X and spike voltage Y are generated when energy of the winding to which voltage supply is interrupted by commutation is released as a reflux current. Timing (a rising edge or a falling edge) at which a signal state of waveform D changes is detected as position detection, and brushless DC motor 184 can be stably driven by repeating the commutation based on this position signal.

FIG. 21 is a block diagram showing a conventional motor driving device described in PTL 3.

As shown in FIG. 21, the conventional motor driving device includes: brushless DC motor 214 composed of a rotor having a permanent magnet and a stator having a three-phase winding; inverter 213 that supplies power to the three-phase winding; and driver 215 that drives inverter 213. The conventional motor driving device further includes a position detector 216 that detects a relative rotational position of the rotor based on an induced voltage generated in a stator winding of brushless DC motor 214 and then outputs a position signal. Furthermore, the conventional motor driving device includes: first waveform generator 217 that outputs a rectangular wave or a sine wave or a waveform similar to these waveforms while performing duty control based on the signal output from position detector 216; and a second waveform generator 219 that outputs a rectangular wave or a sine wave or a waveform similar to these waveforms to brushless DC motor 214. Moreover, the conventional motor driving device includes switching determiner 219 that drives inverter 213 by the output of first waveform generator 217 when brushless DC motor 214 is rotating at a low speed equal to or lower than a predetermined rotation speed, and drives inverter 213 by the output of second waveform generator 218 when brushless DC motor 214 is rotating at a high speed exceeding the predetermined rotation speed. Furthermore, the conventional motor driving device is configured to output a pattern for detecting the induced voltage of brushless DC motor 214 at predetermined timing when driven by second waveform generator 219.

With such a configuration, in the conventional motor driving device, at the low speed, brushless DC motor is subjected to high-efficiency driving of performing sensorless driving by first waveform generator 217 based on the signal of position detector 216, and at the high speed, brushless DC motor 214 is subjected to frequency-fixed synchronous driving by second waveform generator 218. Moreover, in the conventional motor driving device, position detector 216 periodically obtains position information of the rotor based on the detection of the zero-cross point of the induced voltage in brushless DC motor 214 and determines commutation timing. Therefore, stable driving performance is obtained even at a time of high load and high speed driving by the synchronous driving.

However, in the configuration of the conventional motor driving device shown in each of NPL 1 and PTL 3, the current flowing through the motor winding is large under conditions that low-speed high torque is required at such a starting time in the case of the sensorless driving. When the motor winding is switched by the commutation, it takes time until the energy of the winding to which the supply of power is interrupted is consumed as a reflux current.

In FIG. 20, for example, timing of commutation from section K2 to section K3 will be considered. At a time of shift from section K2 to section K3, when energization to a U-phase winding supplied with power is cut off, energy accumulated in the U-phase winding is refluxed through an inside of brushless DC motor 184 via the switching element 183f and the diode 183j, which are shown in FIG. 18, and is then consumed. Hence, diode 183j turns to a conductive state, and is thereby connected to a negative side of the inverter input voltage, and accordingly, spike voltage Y shown in FIG. 20 is generated in the terminal voltage waveform at the time of generation of the reflux current.

In a similar way, at a time of shift from section K4 to section K5, winding energy is consumed as the reflux current via switching element 183c and diode 183g, diode 183g is connected to a positive side of the inverter input voltage, and spike voltage X shown in FIG. 20 is generated.

FIG. 22 shows current waveform A0 and terminal voltage waveform B0, which are waveforms when the conventional motor driving device drives brushless DC motor 214 in a state in which the motor current in the sensorless driving is large. In the conventional motor driving device as shown in FIG. 22, since the current flowing through brushless DC motor 214 is high, the energy accumulated in the U-phase winding as a result that the supply of power to the U-phase winding itself is interrupted is large. Therefore, a release time of the energy, that is, each of a generation period of spike voltage X0 and spike voltage Y0, which are shown in FIG. 22, becomes longer.

Hence, as shown in terminal voltage waveform B0 of FIG. 22, spike voltage X0 and spike voltage Y0 cover and hide the zero-cross point of the induced voltage, so that the position signal cannot be detected.

As a result, in the driving in such a state in which the motor current is large in the sensorless driving, the motor driving device as shown in NPL 1 cannot perform accurate position detection for brushless DC motor 184 Therefore, there are problems such as a decrease in drive torque, a decrease in starting performance due to the decrease in torque, a decrease in motor drive efficiency, a decrease in speed stability, and increases in vibration and noise due to speed fluctuations.

Moreover, in such a configuration of the motor driving device as described in PTL 3, a signal of a special pattern driven by an inverter is output during synchronous driving. In this way, it is made possible to acquire the position signal of brushless DC motor 214, and driving stability at high speed and high load is ensured. However, this configuration cannot serve for improving stability in such a driving state in which the motor current is large and the spike voltage covers and hides a zero crossing signal during the sensorless driving. Hence, in the conventional motor driving device as described in PTL 3, at the time of the sensorless driving when the motor current is high, there are problems similar to those in NPL 1 mentioned above.

CITATION LIST

Patent Literatures

PTL 1: Unexamined Japanese Patent Publication No. H10-028395 (published in 1998)

PTL 2: Unexamined Japanese Patent Publication No. 2008-104337

PTL 3: Unexamined Japanese Patent Publication No. 2010-252406

Non-Patent Literature

NPL 1: "Motor/Inverter Technology for Home Appliance (original title is in Japanese)", edited and written by NAGATAKE Kazuo, published by The Nikkan Kogyo Shimbun, Ltd., Apr. 28, 2000, pp. 88-91

SUMMARY OF THE INVENTION

The present invention has been made in consideration of the above conventional problems and provides a motor driving device that stably starts up even while load torque fluctuations are large. Moreover, the present invention provides a motor driving device capable of reliably detecting the position signal of the brushless DC motor even in the driving state in which high torque driving is required and a large motor current flows at starting and so on, and capable of realizing high torque driving performance including starting performance for the brushless DC motor, and in addition, provides a compressor driving device capable of stably starting a compressor. Furthermore, the present invention provides a refrigerator equipped with such a motor driving device as described above, and provides a refrigerator including a compressor driven by such a motor driving device as described above.

Specifically, the motor driving device according to an example of the exemplary embodiments of the present invention includes: a brushless DC motor that drives a load that fluctuates during one rotation; a driver that applies a voltage to the brushless DC motor and drives the brushless DC motor; and a speed accelerator that determines the voltage to be applied by the driver. The speed accelerator is configured to accelerate the brushless DC motor such that a speed change rate of a speed within one rotation from start of the brushless DC motor with respect to a speed at next one rotation remains within a predetermined value or less. With such a configuration, the speed change of the brushless DC motor due to the load fluctuation is decreased, an occurrence of the vibration is suppressed, and the motor driving device can be started. Hence, even in a state in which the load torque fluctuations are large, the brushless DC motor can be started stably.

Moreover, in the motor driving device according to the example of the exemplary embodiments of the present invention, the speed accelerator may be configured to accelerate the brushless DC motor such that a speed change rate of a speed within one rotation from the start of the brushless DC motor with respect to the speed of the next one rotation remains within a predetermined value or less under a condition where a change of the load during one rotation is maximized. With such a configuration, the motor driving device is capable of being started under the condition where it is most difficult to make the start-up of the load driven by the brushless DC motor, and can be stably started under all the required conditions.

Moreover, the motor driving device according to the example of the exemplary embodiments of the present invention may include a position detector that detects a magnetic pole position of the brushless DC motor. In this case, in the motor driving device, in a state of performing positioning of flowing a current to a specific phase of the brushless DC motor before the start of the motor driving device, and flowing a current to a phase advanced by 90 degrees or more from the phase positioned after the lapse of a predetermined time, the driver is configured to acquire the position information of the position detector, and to start to drive the motor driving device. With such a configuration, driving is performed according to the magnetic pole position of the brushless DC motor, and therefore, even when the load fluctuates during one rotation and the speed greatly changes, the motor driving device can be stably driven.

Moreover, the motor driving device according to an example of the exemplary embodiments of the present invention may be configured as a drive device that drives the compressor. By being driven by the motor driving device, the compressor can be stably started.

Moreover, a refrigerator according to an example of the exemplary embodiments of the present invention may include a compressor driven by the motor driving device, and the compressor may be configured to be started in a state in which a pressure difference between a suction side and discharge side of the compressor remains. This configuration allows the motor driving device to start even in a state in which there is the pressure difference between the suction side and discharge side of the compressor, thereby making it possible to reduce an energy loss in a refrigeration cycle without raising a temperature of the evaporator with a simple system configuration at low cost.

Moreover, the refrigerator according to the example of the exemplary embodiments of the present invention may be configured such that the pressure difference between the suction side and discharge side of the compressor is larger than at least 0.05 MPa. This configuration can reduce the energy loss in the refrigeration cycle while reducing the progress of deterioration due to the increase in vibration and maintaining the reliability of the compressor.

Moreover, a motor driving device according to an example of the exemplary embodiments of the present invention includes: a rectifying/smoothing circuit composed of a rectifier that rectifies an AC voltage and a smoother made of a capacitor that converts an output voltage of the rectifier into a stable DC voltage; a brushless DC motor composed of a rotor having a permanent magnet and a stator having a three-phase winding; and an inverter having six switching elements connected to one another in a three-phase bridge configuration, the inverter receiving the output of the rectifying/smoothing circuit and supplying power to the three-phase winding. Moreover, the motor driving device includes: a position detector that detects a rotational position of the rotor; a speed detector that detects a speed of the brushless DC motor based on a signal from the position detector; an energized phase determiner that determines an energized phase of the stator winding based on the detected rotational position and driving speed of the rotor; and an error detector that detects an error between the speed detected by the speed detector and a target speed. Furthermore, the motor driving device includes: a PWM controller that adjusts an output voltage of the inverter by PWM control by ON chopping or OFF chopping of any one of the switching elements of the inverter such that the speed of the brushless DC motor becomes the target speed; and a drive waveform generator that generates a drive waveform of the inverter. Moreover, the motor driving device is configured to select the one of the switching elements, the switching element performing the chopping by PWM control, such that a current for charging the capacitor of the smoother flows from the winding, to which supply of power is interrupted, when the energized winding of the brushless DC motor is switched. With such a configuration, when the winding of the brushless DC motor is switched, the energy stored in the winding to which the supply of power is interrupted returns as regenerative energy to the power source side, whereby, the current of the winding to which the supply of power is interrupted can be reduced to zero in a short time. In this way, a zero-cross position (that is, a position signal of the brushless DC motor) of the induced voltage as the position information can be reliably detected from the terminal of the brushless DC motor.

Moreover, the motor driving device according to an example of the exemplary embodiments of the present invention may be configured as a driving device that drives the compressor. When the compressor is stopped due to a power failure or the like, the compressor driven by the motor driving device can be promptly restarted even in a state in which large starting torque is required due to the pressure difference between the suction side and discharge side of the compressor. In this way, a stopping period of the compressor can be shortened, and the compressor can be stably started.

Moreover, a refrigerator according to an example of the exemplary embodiments of the present invention may include: a condenser that condenses the high-temperature and high-pressure gas refrigerant compressed by the compressor; a decompressor that decreases the pressure of the liquid refrigerant liquefied by the condenser; and an evaporator that evaporates the liquid refrigerant whose pressure is decreased by the decompressor. Furthermore, the refrigerator according to an example of the exemplary embodiments of the present invention may include a refrigerant flow rate adjuster that shuts off a refrigerant flow path between the condenser and the evaporator, and may be configured such that, while the compressor is being stopped, the refrigerant flow path between the condenser and the evaporator is shut off by the refrigerant flow rate adjuster.

With such a configuration, an increase in temperature of the condenser due to inflow of the high-temperature refrigerant to the condenser side while the compressor is being stopped can be prevented. In this way, the energy loss of the refrigeration cycle at the time when the compressor is restarted can be reduced.

Moreover, the refrigerator according to the example of the exemplary embodiments of the present invention may be configured such that, when the compressor is started from the stopped state, a pressure difference equal to or larger than a predetermined value is added between the suction-side pressure and discharge-side pressure of the compressor.

With such a configuration, even when the compressor is restarted, the compressor can be started from substantially the same pressure state as while the compressor is being driven. Therefore, soon after the compressor is started, the pressure between the suction side and discharge side of the compressor can return to the stable pressure state during the operation of the compressor. Hence, the loss of the refrigeration cycle until the compressor returns to the stable pressure state after being started can be reduced to a large extent.

Moreover, the refrigerator according to the example of the exemplary embodiments of the present invention may include the above-described motor driving device, or a driving device of a compressor, which is composed of the above-described motor driving device. Furthermore, the refrigerator according to the example of the exemplary embodiments of the present invention may include a compressor driven by the above-described motor driving device. With such a configuration, even if the compressor is controlled to turn on or off in order to adjust the internal temperature of the refrigerator, then while the compressor is being stopped, the increase in the thermal load, which is caused by the inflow of the high-temperature refrigerant in the condenser into the evaporator, can be prevented. Furthermore, the energy loss of the refrigeration cycle until the pressure state at the start of the compressor returns to a stable pressure during the operation of the compressor can be suppressed. Therefore, the refrigerator with low power consumption can be provided.

DESCRIPTION OF EMBODIMENTS

Hereinafter, exemplary embodiments of the present invention will be described with reference to the drawings. Note that the present invention is not limited by the exemplary embodiments.

First Exemplary Embodiment

Figure 1:
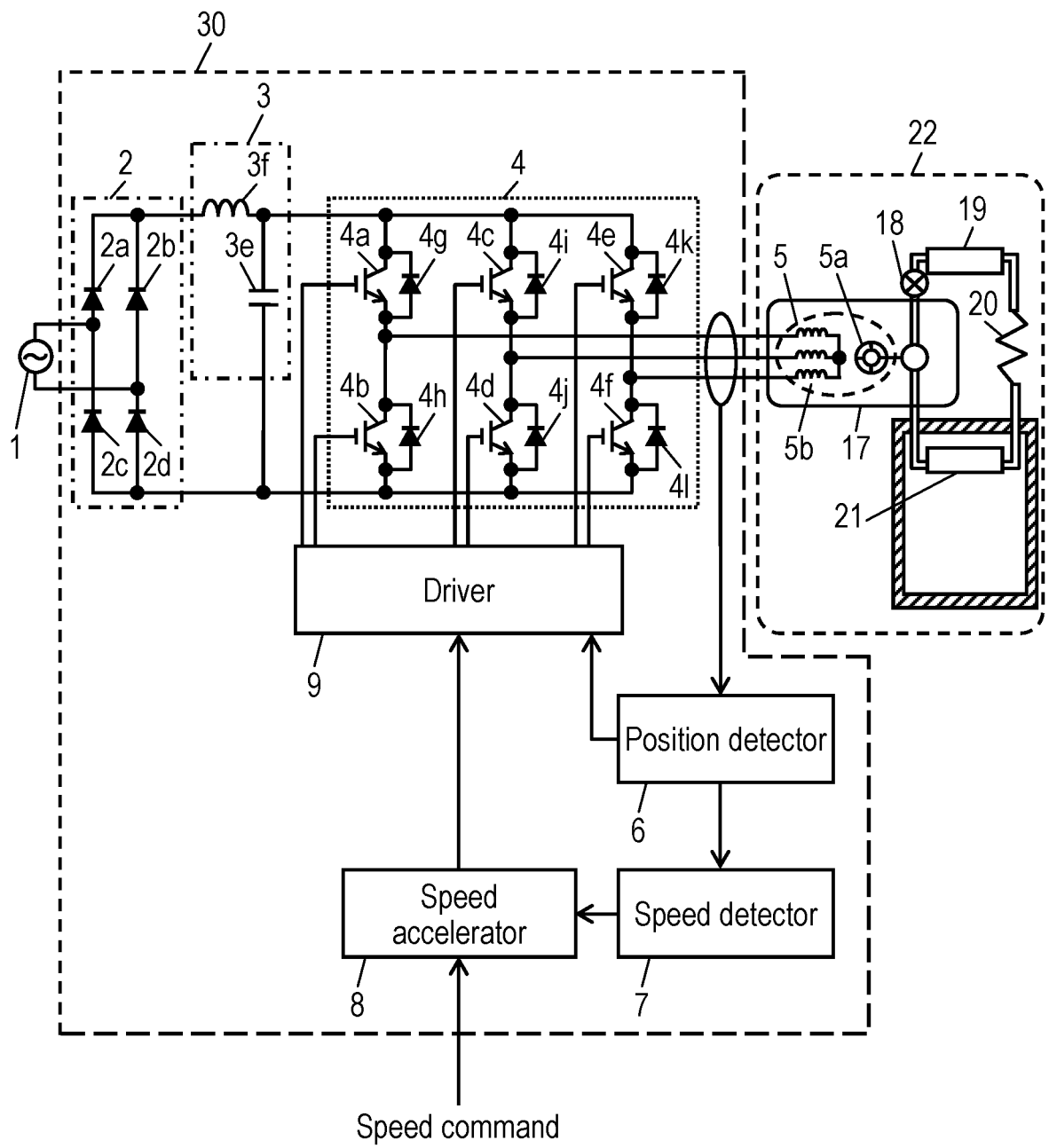
FIG. 1 is a block diagram showing a motor driving device in a first exemplary embodiment of the present invention.

FIG. 1 is a block diagram showing a motor driving device in a first exemplary embodiment of the present invention.

In FIG. 1, motor driving device 30 is connected to AC power source 1, and drives brushless DC motor 5. AC power source 1 is a general commercial power source, which is a 50 Hz or 60 Hz power source with an effective value of 100 V in Japan. A configuration of motor driving device 30 will be described below.

Rectifier circuit 2 rectifies AC power input from AC power source 1 into DC power, and is composed of four rectifying diodes 2a to 2d which are bridge-connected to each other.

Smoother 3 is connected to an output side of rectifier circuit 2, and smoothes an output from rectifier circuit 2. Smoother 3 is composed of smoothing capacitor 3e and reactor 3f. An output from smoother 3 is input to inverter 4.

Note that, since reactor 3f is inserted between AC power source 1 and capacitor 3e, reactor 3f may be located either before or after rectifying diode 2a to 2d. Moreover, when a common mode filter forming a high-frequency remover is provided in the circuit, reactor 3f is constituted in consideration of a composite component with a reactance component of the high-frequency remover.

Inverter 4 converts DC power, which contains large ripple components at a period twice a power source period of AC power source 1 in a voltage from smoother 3, into AC power. Inverter 4 is formed by three-phase bridge-connecting six switching elements 4a to 4f. Moreover, six reflux current diodes 4g to 4l are respectively connected to switching elements 4a to 4f in an opposite direction (in a direction opposite to a direction where switching elements 4a to 4f flow currents).

Brushless DC motor 5 is composed of rotor 5a having a permanent magnet and stator 5b having a three-phase winding. Brushless DC motor 5 rotates rotor 5a by making a three-phase AC current, which is generated by inverter 4, flow in the three-phase winding of stator 5b.

Position detector 6 detects a magnetic pole position of rotor 5a based on an induced voltage generated in the three-phase winding of stator 5b, a current flowing in the three-phase winding of stator 5b, a voltage applied to the three-phase winding, and the like.

In this exemplary embodiment, position detector 6 acquires a terminal voltage of brushless DC motor 5, and detects a relative magnetic pole position of rotor 5a of brushless DC motor 5. Specifically, position detector 6 detects a relative rotational position of rotor 5a based on the induced voltage generated in the three-phase winding of stator 5b. Moreover, position detector 6 detects a zero-cross point by comparing the induced voltage and a reference voltage with each other. A voltage serving as the reference voltage of the zero-cross point of the induced voltage may be a voltage of a virtual midpoint generated from terminal voltages for three phases, or may be a voltage of an acquired DC bus voltage. In this exemplary embodiment, the voltage of the virtual midpoint is defined as the reference voltage. A mode for detecting the relative magnetic pole position of rotor 5a based on the induced voltage has a simple configuration, and enables lower cost.

Speed detector 7 calculates a current driving speed of brushless DC motor 5 from position information detected by position detector 6. In this exemplary embodiment, speed detector 7 measures a time from the detection of the zero-cross point of the induced voltage, and calculates the current speed based on the measured time.

Speed accelerator 8 calculates a voltage to be applied to brushless DC motor 5 based on the current speed detected by speed detector 7. For the calculation of the voltage to be applied in speed accelerator 8, there may be used such proportional control of changing magnitude of the applied voltage according to a difference between a target speed rising with the lapse of time and the current speed. Alternatively, the applied voltage may be determined by a predetermined voltage change rate such that the target speed can be reached under a condition where a load change is maximum to make acceleration most difficult. When the voltage to be applied is calculated by the proportional control, the target speed is determined based on a degree of acceleration. For example, an initial target speed and applied voltage are fixed, and the target speed is determined based on magnitude of the speed detected by speed detector 7 as a result of applying the voltage. The target speed is set smaller as the result of speed detector 7 is larger, and the target speed is set larger as the result of speed detector 7 is smaller.

With such a configuration, the larger the load is, the higher an average speed after one rotation is, and a speed change of a next one rotation is suppressed to a level at which vibrations are not a problem. Therefore, the vibrations can be suppressed. The level at which the speed change is not a problem refers to a state in which a speed change rate when pressures of a suction side and discharge side of the compressor are balanced and a speed change rate when the pressures have a difference therebetween are substantially the same. Moreover, the fact that the pressures of the suction side and discharge side of the compressor are balanced refers to a state in which the pressure difference between the suction and discharge of the compressor enables the compressor to function by a conventional starting method and does not allow the vibrations to affect reliability. In this exemplary embodiment, the pressure difference shall be 0.05 MPa or less. The speed change rate when the pressure difference between the suction side and discharge side of the compressor is the maximum is defined as a value obtained by dividing a minimum speed at the time of one rotation from a certain point of time by an initial speed of the one rotation. For example, if the speed at a certain point of time is 3 r/s, and the minimum speed when one rotation is made from this is 2.7 r/s, then the speed change rate is 0.9 as a result of dividing 2.7 by 3.

With regard to the voltage change rate, in this exemplary embodiment, there is adopted a mode for determining the applied voltage after determining the voltage change rate in advance. This mode has an extremely simple configuration, and accordingly, enables the system to be constructed at lower cost.

Moreover, speed accelerator 8 receives a speed command (target driving speed) input from the outside, and starts to output an applied voltage command for the start-up.

Driver 9 outputs supply timing of power to be supplied by inverter 4 to the three-phase winding of brushless DC motor 5 and a drive signal for PWM control based on position information of rotor 5a of the brushless DC motor, the position information being detected by position detector 6.

Specifically, the drive signal turns on or off switching elements 4a to 4f of inverter 4. With this operation, optimal AC power is applied to stator 5b to rotate rotor 5a and to drive brushless DC motor 5. Drive waveforms include rectangular waves and sine waves; however, are not particularly limited to these.

Moreover, driver 9 calculates and outputs a PWM duty width based on the applied voltage set by speed accelerator 8.

Furthermore, in driver 9, which phase is to be energized is determined based on information from position detector 6. In this exemplary embodiment, since motor driving device 30 is driven by a 120-degree rectangular wave, switching elements 4a, 4c and 4e of an upper arm are energized while being shifted by 120 degrees from one another. In a similar way, switching elements 4b, 4d and 4f of a lower arm are also energized while being shifted by 120 degrees from one another. OFF periods at intervals of 60 degrees exist between energization periods of switching elements 4a and 4b, between energization periods of switching elements 4c and 4d, and between energization periods of switching elements 4e and 4f.

Moreover, at the time of starting motor driving device 30, driver 9 energizes at least two arbitrary phases of brushless DC motor 5, for example, for one second such that the position of rotor 5a comes to a specific magnetic pole position. Thereafter, driver 9 energizes a phase advanced by 90 degrees to 150 degrees from such a phase that was being energized, and waits for position detector 6 to detect the position of the rotor of brushless DC motor 5.

Then, when position detector 6 detects the position, and a position detection signal is input to driver 9, the state shifts to a normal driving state in which such an energized phase is switched to a next phase. During an initial period of energizing at least two phases, the phases being energized are energized until the state of the phases turns to a state in which the phases are delayed by 90 degrees from such a state in which brushless DC motor 5 is normally driven after being started.

In this way, the phases at the time of starting motor driving device 30 can be surely fixed, and further, the phases to be energized next are advanced by 90 degrees to 150 degrees, whereby the same state of the energized phases as the state of the normal driving can be established. Therefore, large output torque of brushless DC motor 5 can be ensured, and further, start-up vibrations due to a phase delay can be reduced.

Next, a description will be made of a freezer and a refrigerator, each of which uses motor driving device 30 in this exemplary embodiment. The refrigerator will be described below as an example; however, the same applies to the freezer.

Refrigerator 22 is mounted with compressor 17. Compressor 17 is composed of brushless DC motor 5, a crankshaft, a piston, and a cylinder. A rotational motion of rotor 5a of brushless DC motor 5 is converted into a reciprocating motion by the crankshaft. The piston connected to the crank shaft reciprocally moves in the cylinder, thereby compressing a refrigerant in the cylinder.

An arbitrary compression mode such as a rotary-type compression mode and a scroll-type compression mode is used as a compression mode (mechanical mode) of compressor 17. In this exemplary embodiment, the case where the compression mode is a reciprocating-type one will be described. Reciprocating-type compressor 17 causes large torque fluctuations in suction and compression processes, resulting in large fluctuations in speed and current value.

The refrigerant compressed by compressor 17 flows through such a refrigeration cycle that sequentially passes through two-way valve 18, condenser 19, decompressor 20, and evaporator 21 and returns to compressor 17 again. At this time, heat is radiated in condenser 19, and heat is absorbed in evaporator 21, and accordingly, cooling and heating can be performed. Refrigerator 22 is composed by mounding such a refrigeration cycle as described above thereon.

As two-way valve 18, an electromagnetic valve openable/closable by energization, or the like is used. During an operation of compressor 17, two-way valve 18 is opened, causes compressor 17 and condenser 19 to communicate with each other, and flows the refrigerant between compressor 17 and condenser 19. Meanwhile, during stoppage of compressor 17, two-way valve 18 is closed, and closes a space between compressor 17 and condenser 19 to prevent the refrigerant from flowing therebetween.

With reference to FIGS. 2A to 4B, a description will be made of operations of motor driving device 30 mounted on refrigerator 22 configured as described above.

In each of FIGS. 2A to 4B, an axis of abscissas indicates a phase of the magnetic pole position of rotor 5a of brushless DC motor 5. An axis of ordinates in each of FIGS. 2A, 3A and 4A indicates load torque driven by brushless DC motor 5. An axis of ordinates in each of FIGS. 2B, 3B and 4B indicates the driving speed of brushless DC motor 5.

Moreover, as shown in FIGS. 2A to 4B, while the load torque and the speed of brushless DC motor 5 change greatly, timing at which the load torque is increased and timing at which the speed of brushless DC motor 5 is minimized do not coincide with each other, and there is a response delay in the speed of brushless DC motor 5 with respect to the load torque.

First, with reference to FIGS. 2A and 2B, a description will be made of a speed change of brushless DC motor 5 by motor driving device 30 under a start condition of the conventional compressor.

Figure 2A:
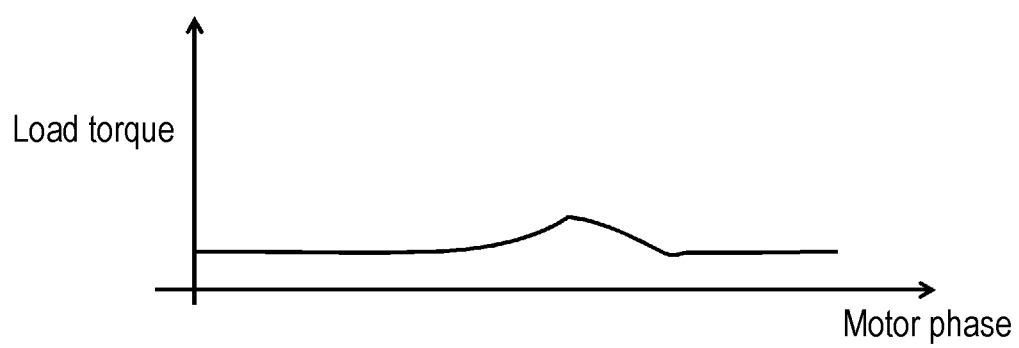
FIG. 2A is a transition diagram of load torque equivalent to one rotation of load torque when a discharge pressure and suction pressure of a compressor of the motor driving device in the first exemplary embodiment of the present invention are balanced.
Figure 2B:
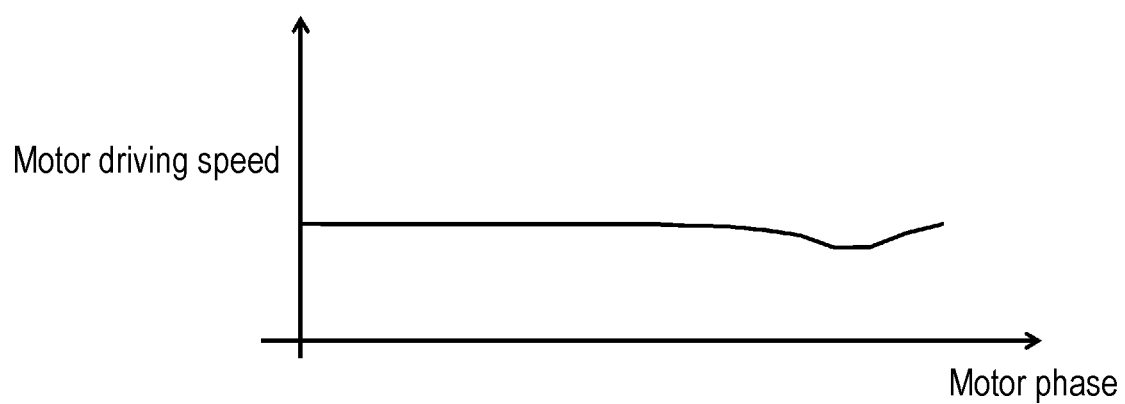
FIG. 2B is a transition diagram of a speed equivalent to one rotation in a conventional starting method when the discharge pressure and suction pressure of the compressor of the motor driving device in the first exemplary embodiment of the present invention are balanced.

FIG. 2A shows a change in the load torque applied to brushless DC motor 5 at one rotation when the pressure difference between the suction side and discharge side of compressor 17 is 0.05 MPa. The pressure difference of 0.05 MPa is a maximum pressure difference which can be regarded as being balanced as the pressure difference between the suction side and discharge side of the conventional compressor, and is a maximum allowable pressure difference in terms of the operation of compressor 17. That is, a speed change rate at the maximum pressure difference allowed at the time of start-up when the speed change rate is largest becomes the maximum allowable speed change rate. FIG. 2B shows a change in the speed of the brushless DC motor at the maximum pressure difference that can be regarded as being balanced. An initial speed represents 3 r/s which is a speed of the conventional synchronous operation, and FIG. 2B shows a speed change when brushless DC motor 5 makes one rotation at this initial speed. That is, when the pressure difference between the suction side and discharge side of compressor 17 is 0.05 MPa, only the speed change rate shown in FIG. 2B is allowed in compressor 17.

Next, with reference to FIGS. 3A and 3B, a description will be made of a speed change in the start-up of brushless DC motor 5 by motor driving device 30 when the load torque fluctuations are large in the conventional compressor starting method.

Figure 3A:
FIG. 3A is a transition diagram of load torque equivalent to one rotation of the load torque when a differential pressure is given to the discharge pressure and suction pressure of the compressor of the motor driving device in the first exemplary embodiment of the present invention.
Figure 3B:
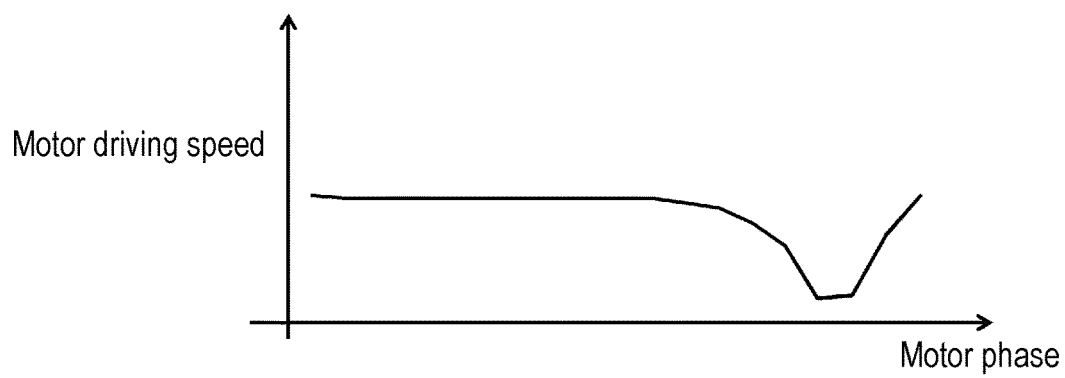
FIG. 3B is a transition diagram of a speed equivalent to one rotation in the conventional starting method when the differential pressure is given to the discharge pressure and suction pressure of the compressor of the motor driving device in the first exemplary embodiment of the present invention.

FIG. 3A shows a change in the load torque at one rotation of brushless DC motor 5 under conditions that the pressure difference between the suction side and discharge side of compressor 17 is 0.25 MPa, which means that the load applied to brushless DC motor 5 is increased about five times that in FIG. 2A. This pressure difference of 0.25 MPa is a maximum pressure difference in the configuration of compressor 17 mounted on refrigerator 22 of the this exemplary embodiment, and this is a maximum load (maximum load change) to be driven while brushless DC motor 5 makes one rotation. FIG. 3B shows a change in the speed of the brushless DC motor at one rotation at this time. As in FIG. 2B, the initial speed is 3 r/s which is the conventional synchronous operation speed. Such a speed change at this time is larger than that in FIG. 2B. The speed change rate increases, and the vibrations are greatly increased.

Next, with reference to FIGS. 4A and 4B, a description will be made of a speed change in the start-up of brushless DC motor 5 by motor driving device 30 when the load torque fluctuations are large in this exemplary embodiment.

Figure 4A:
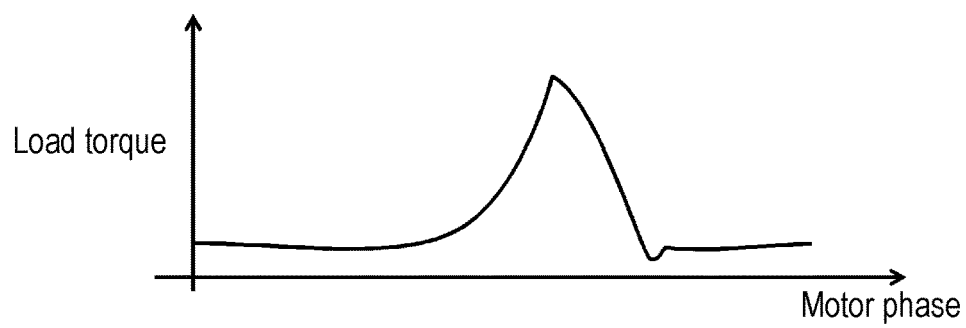
FIG. 4A is a transition diagram of load torque equivalent to one rotation of the load torque when a differential pressure is given to the discharge pressure and suction pressure of the compressor of the motor driving device in the first exemplary embodiment of the present invention.
Figure 4B:
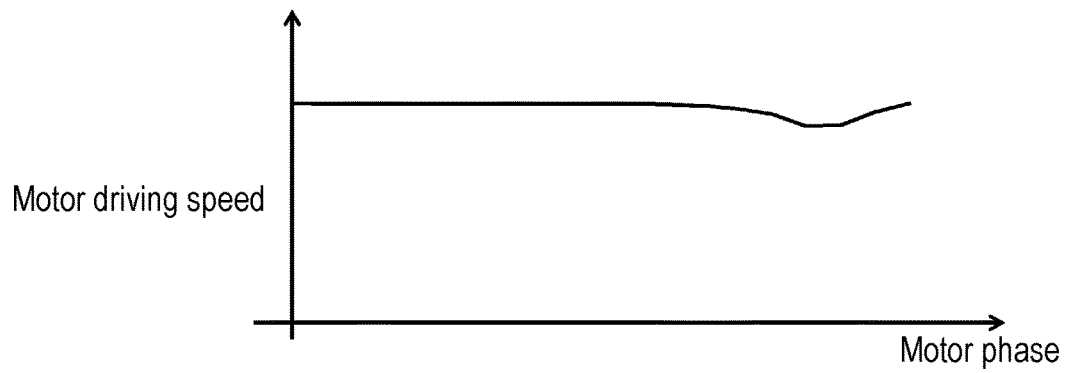
FIG. 4B is a transition diagram showing a speed equivalent to one rotation when an initial speed is set as a target speed in a starting method in the first exemplary embodiment of the present invention when a differential pressure is given between the discharge pressure and suction pressure of the compressor of the motor driving device in the first exemplary embodiment of the present invention.

As in FIG. 3A, FIG. 4A shows the load torque applied to brushless DC motor 5 when the pressure difference between the suction side and discharge side of compressor 17 is 0.25 MPa. FIG. 4B shows a speed change when motor driving device 30 in this exemplary embodiment sets the target speed, which is to be reached within one rotation of brushless DC motor 5, as the initial speed. FIG. 4B shows a speed change when the initial speed is set to about 6.71 r/s which is a speed obtained by multiplying the conventional start-up speed by a square root of 5 under the condition of the load torque of FIG. 4A. That is, the target speed is 6.71 r/s. The speed change rate in FIG. 4B is the same as the conventional one.

The speed change rate is proportional to the load by a square of the speed. Therefore, when the load becomes five times, the speed is multiplied by the square root of 5, whereby the speed change rate in this case can be equalized to the speed change rate at the driving speed under the load condition shown in FIG. 2A and FIG. 2B.

Figure 5:
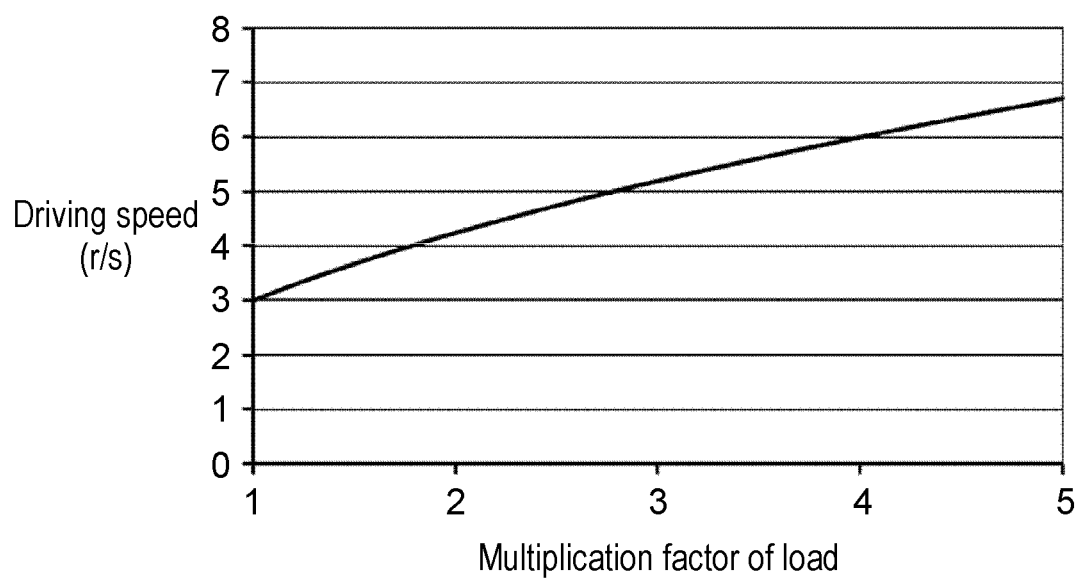
FIG. 5 is a graph showing a relationship of a speed at which a speed change rate becomes constant with respect to a load of the motor driving device in the first exemplary embodiment of the present invention.

FIG. 5 shows how much speed is required when the load changes in the case where the rotational speed is set to 3 r/s and the load in the following case of the pressure difference is set to 1. Here, the pressure difference is a pressure difference between the suction side and discharge side of compressor 17, of which value is 0.05 MPa as the maximum pressure difference when the pressures on the suction side and the discharge side are balanced. From FIG. 5, it is seen that, for example, if the load is increased to four times, the speed just needs to be set to 6 r/s, which is obtained by multiplying 3 r/s by 2 which is a square root of 4.

That is, with regard to the maximum load change in the state in which the pressures of the suction side and discharge side of compressor 17 are considered to be balanced, a multiplication factor (for example, five times) of the load change at the maximum pressure difference between the suction side and discharge side of compressor 17 is multiplied by the square root, whereby the target speed required for the system such as refrigerator 22 is obtained, and the speed of brushless DC motor 5 is caused to reach the obtained target speed within one rotation of brushless DC motor 5 itself. In this way, the vibrations of compressor 17 can be suppressed.

The speed change, which occurs within one rotation of brushless DC motor 5 from the start-up of motor driving device 30, applies force to a state in which an object of which reliability is a problem, such as compressor 17 affected by the speed change, is not vibrating. Therefore, due to inertial force of the object such as compressor 17, which is affected by the speed change, compressor 17 is hardly affected by the speed change, and this does not lead to a problem. However, as the rotation of brushless DC motor 5 continues and the speed change continues, compressor 17 is greatly affected.

Next, detailed drive control for motor driving device 30 will be described with reference to FIG. 6. The drive control for motor driving device 30 is called by a command from the outside during stoppage of compressor 17 to start brushless DC motor 5, and is ended by the fact that the driving speed of brushless DC motor 5 reaches the target speed and the starting of brushless DC motor 5 is completed.

Figure 6:
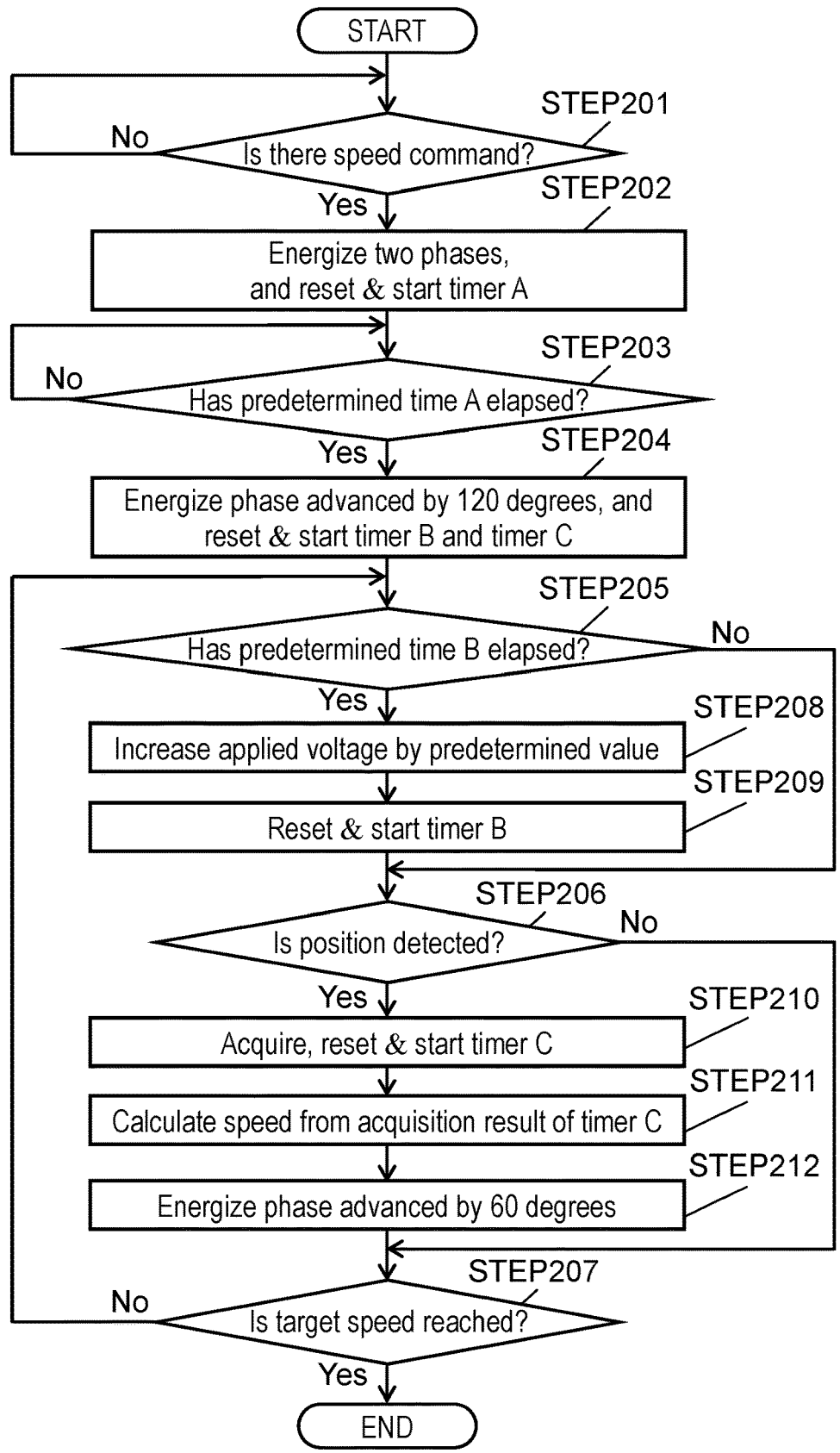
FIG. 6 is a flowchart showing a starting method of the motor driving device in the first exemplary embodiment of the present invention.

As shown in FIG. 6, first, in STEP 201, speed accelerator 8 determines whether or not there is a speed command that issues an instruction on the speed for driving compressor 17. If there is no speed command, the process proceeds again to STEP 201, and if there is a speed command, the process proceeds to STEP 202. Here, it is determined that there is no speed command yet, and the process proceeds to STEP 201.

When the process proceeds to STEP 201 again, it is determined again whether or not there is a speed command. That is, the process is on standby in STEP 201 until the speed command is input from the outside. Here, it is determined that the speed command is input from the outside, and the process proceeds to STEP 202.

In STEP 202, in order to prepare the start-up, driver 9 energizes arbitrary two phases of brushless DC motor 5, starts to flow a current through the phases, and resets and starts timer A. At this time, speed accelerator 8 adjusts the applied voltage such that the current is less than a current demagnetizing the permanent magnet of rotor 5a of brushless DC motor 5 and less than the current at which inverter 4 breaks. Then, the process proceeds to STEP 203.

In STEP 203, driver 9 determines whether or not timer A shows a time equal to or more than predetermined time A. If the time of timer A is equal to or more than predetermined time A, then the process proceeds to STEP 204, and if the time of timer A is less than predetermined time A, then the process proceeds to STEP 203. Here, it is determined that predetermined time A has not elapsed, and the process proceeds to STEP 203 again.

Again in STEP 203, values of timer A and predetermined time A are compared with each other, and the above-described determination is made. That is, the process is on standby in STEP 203 until predetermined time A has elapsed since the start of the energization to brushless DC motor 5, and the current continues to flow to two phases of brushless DC motor 5, and the phase is fixed. Predetermined time A just needs to be a time while the phase is sufficiently fixed, and for example, is one second in this exemplary embodiment. Here, it is determined that the value of timer A has reached predetermined time A or more, and the process proceeds to STEP 204.

In STEP 204, driver 9 starts to energize a phase advanced by 120 degrees from the phase determined from the arbitrary two phases started to be energized in STEP 202, and thereafter, resets and starts timer B and timer C. If switching element 4a and switching element 4d are energized in STEP 202, then switching element 4c and switching element 4f are energized in STEP 204. Then, the process proceeds to STEP 205.

In STEP 205, driver 9 determines whether or not timer B shows a time equal to or more than predetermined time B. If the time of timer B is equal to or more than predetermined time B, then the process proceeds to STEP 208, and if the time of timer B is less than predetermined time B, then the process proceeds to STEP 206. Here, it is determined that the time of timer B is less than predetermined time B because the energization in STEP 204 has just started, and the process proceeds to STEP 206.

In STEP 206, it is determined whether or not the position detector 6 has been able to detect the position of brushless DC motor 5. If position detector 6 has been able to detect the position, then the process proceeds to STEP 210, and if position detector 6 has not been able to detect the position, then the process proceeds to STEP 207. Here, it is determined that such position detection has not been enabled because the energization in STEP 204 has just started, and the process proceeds to STEP 207.

In STEP 207, it is determined whether or not the speed detected by speed detector 7 has reached the speed (the rotation speed of the brushless DC motor) required for the speed change rate of the next one rotation to be equal to or less than the predetermined value. If the detected speed has reached the target speed, the process is ended, and if the detected speed has not reached the target speed, the process proceeds again to STEP 205. The target speed is a maximum load when the pressures of the suction side and discharge side of compressor 17 are considered to be balanced, and is obtained from the case of the start-up at the conventional speed. If it is assumed that the conventional speed is 3 r/s and the load is increased to five times, the target speed becomes about 6.71 r/s. Here, since the position detection has not been performed yet, the process returns to STEP 205 again.

In STEP 205, driver 9 determines whether or not timer B shows the time equal to or more than predetermined time B. Here, it is determined that a series of the processing has been performed and that predetermined time B has elapsed, and the process proceeds to STEP 208.

In STEP 208, in order to raise the voltage to be applied from driver 9 to brushless DC motor 5 and in order to accelerate brushless DC motor 5, an applied voltage command value is added to a current applied voltage command value by a constant value. Here, as the value to be added, a value at which the target driving speed can be reached within one rotation of brushless DC motor 5 under the maximum load condition in this exemplary embodiment is determined in advance by experiment or simulation. Then, the process proceeds to STEP 209.

In STEP 209, timer B is reset and restarted in order to determine next timing of increasing the applied voltage, and the process proceeds to STEP 206.

In STEP 206, the position detection is performed after a lapse of a certain time from the start of the energization in STEP 204, and the process proceeds to STEP 210 if position detector 6 can detect the position of brushless DC motor 5.

In STEP 210, a value of timer C is acquired, and timer C is restarted after timer C is reset. Timer C displays a duration of a current applied voltage pattern. Then, the process proceeds to STEP 211.

In STEP 211, the speed is calculated by taking a reciprocal number of the acquired value of timer C, and the process proceeds to STEP 212.

In STEP 212, an energization pattern in which phases are advanced by 60 degrees from the current energized phases is applied, and the process proceeds to STEP 207.

By repeating a route from STEP 205 to STEP 207, brushless DC motor 5 is accelerated and reaches the target speed. Then, the process is terminated as a result that brushless DC motor 5 has reached the target speed in STEP 207.

In the above-described flow, the process is performed for a while since the process is called during the stoppage of compressor 17 until the start-up is completed, and thus compressor 17 can be started without large vibrations even under the load condition where the pressure difference between the suction side and discharge side of compressor 17 is larger than 0.05 MPa.

When the applied voltage is not changed in response to the speed in one rotation of brushless DC motor 5 but is monotonically increased for the acceleration in a state in which the pressure difference between the suction side and the discharge side in compressor 17 is larger than 0.05 MPa, the load torque fluctuates greatly due to the pressure difference, and the speed fluctuation increases. Therefore, the vibrations increase, and there is a problem of an increase in possibility of a failure due to abrasion of components of compressor 17. However, in this exemplary embodiment, the reliability of motor driving device 30 can be greatly enhanced as compared with the conventional application method.

Next, a description will be made of a case where motor driving device 30 of this exemplary embodiment is used for compressor 17 and is mounted on refrigerator 22.

When compressor 17 is started up, two-way valve 18 is simultaneously opened to cause the outlet of compressor 17 and condenser 19 to communicate with each other. Although two-way valve 18 is to be opened at the same time as the start-up of compressor 17, no problem arises even when two-way valve 18 is opened slightly before or after the start-up. Continuously driving compressor 17 will increase a pressure in condenser 19 and reduce a pressure in evaporator 21 through decompression by decompressor 20.

At this time, a high pressure is generated on the discharge side of compressor 17, which communicates with condenser 19, and a low pressure is generated on the suction side of compressor 17, which communicates with evaporator 21. Here, it is assumed that a temperature inside refrigerator 22 has dropped to stop compressor 17. While two-way valve 18 remains open, pressures in condenser 19 and evaporator 21 are gradually balanced. Although the following depends on a system configuration of refrigerator 22, it takes about 10 minutes to arrive at a balanced state in which the pressure difference between the suction side and discharge side of compressor 17 is equal to or less than 0.05 MPa.

When two-way valve 18 is shifted from such an open state to a closed state at the same time as the stoppage of compressor 17, the pressure difference between condenser 19 and evaporator 21 is almost maintained, and the pressure difference is left between the suction side and discharge side of compressor 17. It is assumed that a temperature inside refrigerator 22 has risen, and that compressor 17 is to be started up again. Here, a comparison is made between a case in which compressor 17 is started up from a state in which valve 18 is closed to hold the pressure difference during the stoppage of compressor 17 and a case in which compressor 17 is started up from a state in which the pressures are balances. As a result, in the case of the state in which two-way valve 18 is closed to hold the pressure difference, power for providing the pressure difference again between condenser 19 and evaporator 21 can be saved more. Therefore, energy saving can be realized.

Moreover, even when such a refrigerator temperature rises before 10 minutes elapse from the stoppage of compressor 17 until the pressures are balanced even when two-way valve 18 is left open also during the stoppage of compressor 17, and in addition, even when two-way valve 18 is not provided, motor driving device 30 can be started only when the pressure difference between the suction side and discharge side of compressor 17 is equal to or less than 0.05 MPa in the conventional case. Therefore, it is necessary to wait for 10 minutes to elapse.

Meanwhile, in this exemplary embodiment, it is possible to start motor driving device 30 even at a differential pressure larger than 0.05 MPa, and accordingly, it is possible to start motor driving device 30 at such timing when the temperature in the refrigerator rises and it is necessary to operate compressor 17. Hence, in comparison with the case where compressor 17 is started in a state in which the pressures of the suction side and discharge side of compressor 17 are balanced, the power for providing the pressure difference between the condenser 19 and the evaporator 21 decreases. Therefore, the energy saving can be achieved.

In comparison with a three-way valve or a four-way valve, two-way valve 18 can simply compose a system such as a refrigerator, and can maintain a pressure difference between the suction side and discharge side of compressor 17.

As described above, motor driving device 30 of this exemplary embodiment includes: brushless DC motor 5 that drives the load of which magnitude fluctuates during one rotation of brushless DC motor 5; and driver 9 that applies a voltage to brushless DC motor 5 and drives brushless DC motor 5. Motor driving device 30 of this exemplary embodiment further includes speed accelerator 8 configured to determine the voltage to be applied by driver 9 so as to accelerate brushless DC motor 5 such that the speed change rate of the speed of brushless DC motor 5 within one rotation from the start with respect to the speed at the next one rotation remains within the predetermined value or less. With such a configuration, since the speed has a square effect on the load (since the speed change rate is proportional to the square of the speed relative to the load), the speed change in brushless DC motor 5 can be suppressed with a small increase in speed with respect to the increase in load, and the vibrations of brushless DC motor 5 can be reduced. In this way, even in a state in which the load torque fluctuations are large, brushless DC motor 5 can be started stably.

Moreover, in motor driving device 30 of this exemplary embodiment, speed accelerator 8 may be configured to accelerate brushless DC motor 5 such that the speed change rate, which indicates the degree how the speed of brushless DC motor 5 within one rotation from the start changes with respect to the speed of the next one rotation, remains within the predetermined value or less under the load condition calculated from the maximum load change during one rotation of brushless DC motor 5. With such a configuration, it is possible to make the start-up under the condition where it is most difficult to make the start-up in the load driven by brushless DC motor 5, and the start-up can be stably made under all the required conditions.

Moreover, motor driving device 30 of this exemplary embodiment may include position detector 6 that detects the magnetic pole position of brushless DC motor 5. In this case, driver 9 performs positioning of flowing a current to a specific phase of brushless DC motor 5 before the start-up of motor driving device 30, and flows a current to a phase advanced by 90 degrees or more from the phase positioned after the lapse of a predetermined time. Then in this state, driver 9 acquires the position information from position detector 6, and starts to drive motor driving device 30. With such a configuration, it is possible to drive motor driving device 30 in response to the magnetic pole position of brushless DC motor 5. Therefore, even when the load fluctuates and the speed fluctuates greatly during one rotation of brushless DC motor 5, motor driving device 30 can be driven stably.

Moreover, in refrigerator 22 in which motor driving device 30 of this exemplary embodiment is used, motor driving device 30 drives compressor 17 in the refrigeration cycle in which the constituents are connected to one another in order of compressor 17, condenser 19, decompressor 20, evaporator 21 and compressor 17. Furthermore, refrigerator 22 of this exemplary embodiment is configured to start motor driving device 30 in a state in which the pressure difference between the suction side and discharge side of compressor 17 remains. With such a configuration, even in a state in which the pressure difference exists between the suction side and discharge side of compressor 17, motor driving device 30 can be started. In this way, with a simple system configuration and at low cost, the temperature of evaporator 21 is not allowed to be raised, and an energy loss in the refrigeration cycle can be reduced.

Moreover, motor driving device 30 of this exemplary embodiment may be configured such that the pressure difference between the suction side and discharge side of compressor 17 is larger than at least 0.05 MPa. With such a configuration, even when there is a pressure difference at which vibration normally increases, acceleration of a deterioration due to the increase in vibration can be reduced, and the energy loss in the refrigeration cycle can be reduced while maintaining the reliability of compressor 17.

Second Exemplary Embodiment

Figure 7:
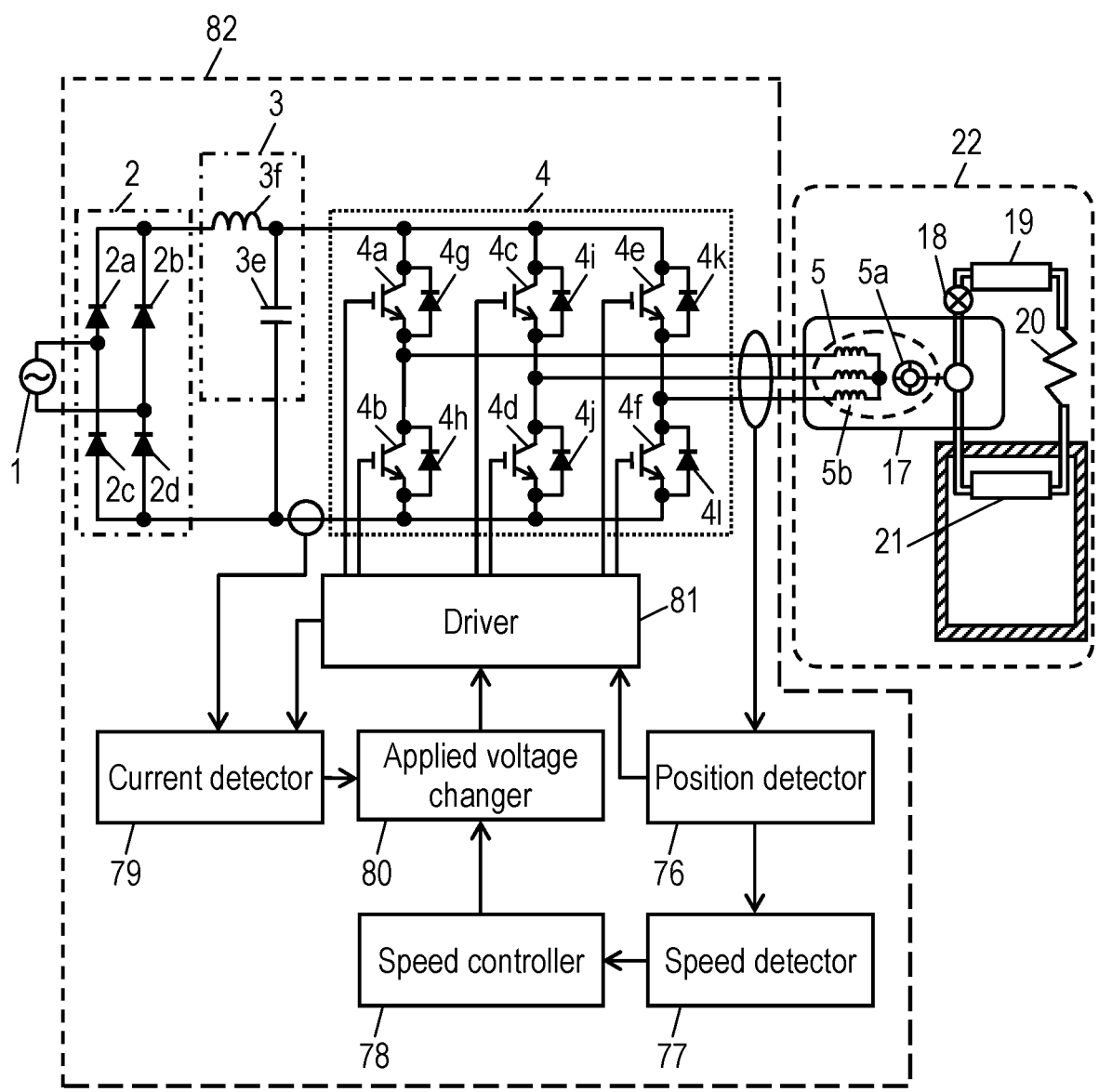
FIG. 7 is a block diagram showing a motor driving device in a second exemplary embodiment of the present invention.

Motor driving device 82 in a second exemplary embodiment of the present invention will described. FIG. 7 is a block diagram showing the motor driving device in the second exemplary embodiment of the present invention. In FIG. 2, the same reference numerals are assigned to the same components as those in the first exemplary embodiment shown in FIG. 1, and a description thereof will be omitted.

In this exemplary embodiment, rectifier circuit 2, smoother 3 and inverter 4, which compose motor driving device 82, and brushless DC motor 5, which composes refrigerator 22, have the same configurations as those in the first exemplary embodiment.

Moreover, position detector 76 of motor driving device 82 of this exemplary embodiment has the same configuration as that of position detector 6 of the first exemplary embodiment.

Speed detector 77 calculates a current driving speed of brushless DC motor 5 and an average speed of one past rotation from position information detected by position detector 76. In this exemplary embodiment, speed detector 77 measures a time from the detection of the zero-cross point of the induced voltage, and performs calculation for this measured time as the current speed. Moreover, speed detector 77 detects an interval between such induced voltage zero-cross points as an interval elapsed time, calculates a sum of the interval elapsed times in the one past rotation, and calculates the average speed of one rotation of brushless DC motor 5 from a result of the calculation.

Speed controller 78 compares the average speed of one rotation of brushless DC motor 5, which is detected by speed detector 77, and the target speed with each other. If the target speed is higher than the average speed of one rotation, then the applied voltage to brushless DC motor 5 is set so as to rise. If the target speed is lower than the average speed of one rotation, then the applied voltage to brushless DC motor 5 is set so as to drop. If the average speed of one rotation of brushless DC motor 5 and the target speed coincide with each other, then the applied voltage to brushless DC motor 5 is set so as to be maintained.

Current detector 79 detects the current flowing through brushless DC motor 5. As the current to be detected, a current flowing through each phase of brushless DC motor 5 may be detected, or a DC bus current flowing through inverter 4 may be detected. In the case of detecting the DC bus current of inverter 4, if the DC bus is detected as a total current flowing through brushless DC motor 5, then a current of a peak flowing through the three phases can be detected, and accordingly, it is unnecessary to decompose the currents flowing through the respective phases.

Moreover, current detector 79 detects the current by, for example, inserting a DC current sensor, a resistor for current detection or the like in series. In the case of using the DC current sensor, the current can be detected with high accuracy, and therefore, finer control can be performed. In the case of using the resistor, a circuit of motor driving device 82 can be configured at low cost. Moreover, in the case of using the resistor, accuracy can be improved by using an amplifier, filter circuit and the like for the voltage. Even when the amplifier, the filter circuit and the like, which are as described above, are used, it is generally inexpensive to use the resistor rather than the current sensor. Motor driving device 82 of this exemplary embodiment uses the resistor, and is configured to detect the current between such DC buses of inverter 4.

Applied voltage changer 80 corrects the PWM ON ratio determined by speed controller 78. If the current, which is input to applied voltage changer 80 and is detected by current detector 79, is higher than a first threshold value, then the PWM ON ratio determined by speed controller 78 is reduced. Meanwhile, if the current detected by current detector 79 is lower than a second threshold value, then the PWM ON ratio determined by speed controller 78 is increased.

The first threshold value is set to a value smaller than a value obtained by subtracting a maximum value of a current, which increases in one carrier, from a value of a current that is not desired to be actually flown through brushless DC motor 5 and inverter 4. In this exemplary embodiment, the first threshold value is set to 3 A, which is a current value smaller than values obtained by subtracting such a maximum current value, which increases in one carrier, from a rated current of inverter 4 and a demagnetization current of brushless DC motor 5. The second threshold value just needs to be equal to or less than the first threshold value, and equal to or more than a current value minimum necessary to drive brushless DC motor 5. The second threshold value may be the same value as the first threshold value. In this exemplary embodiment, the second threshold value is set to 2.75 A obtained by subtracting 0.25 A, which is the maximum current value that changes in one carrier, from the first threshold value.

An amount of the PWM ON ratio to be changed by applied voltage changer 80 may be fixed, or may be subjected to PI control by using differences between the current value detected by current detector 79 and the first threshold value and the second threshold value. When the amount of the PWM ON ratio to be changed by applied voltage changer 80 is fixed, the circuit of motor driving device 82 an be realized with a simpler configuration, and when the amount of the PWM ON ratio is subjected to the PI control, the amount concerned can be suppressed more accurately at a current value closer to the threshold value. In this exemplary embodiment, the amount of the PWM ON ratio to be changed by applied voltage changer 80 is fixed.

Driver 81 has the same configuration as driver 9 of the first exemplary embodiment. Moreover, driver 81 outputs the applied voltage, which is set by applied voltage changer 80, based on the PWM control.

Furthermore, timing of a PWM timer is output from the driver 81 to current detector 79 in order to determine timing at which current detector 79 detects the current.

Figure 8:
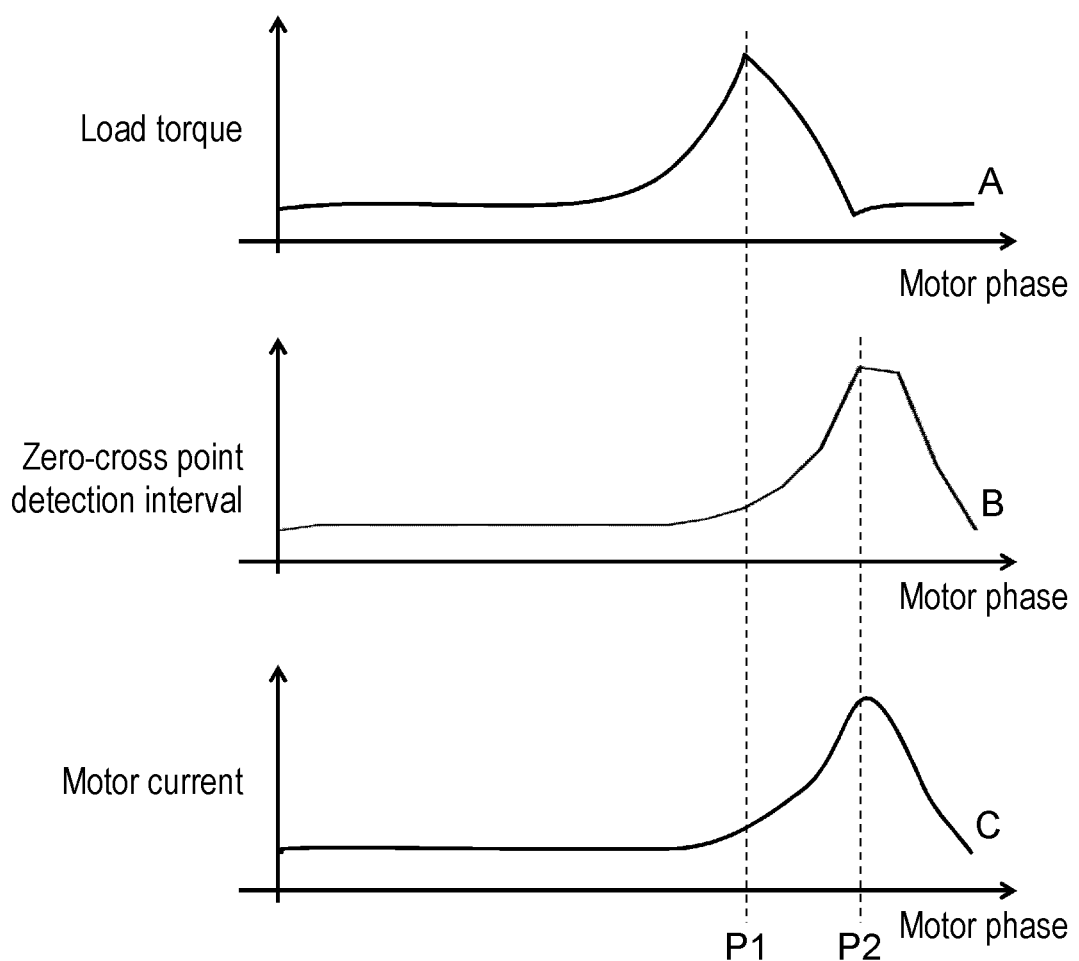
FIG. 8 is a transition diagram showing changes in load torque, zero crossing interval, and motor current with respect to a phase of a brushless DC motor in a conventional motor driving device.
Figure 9:
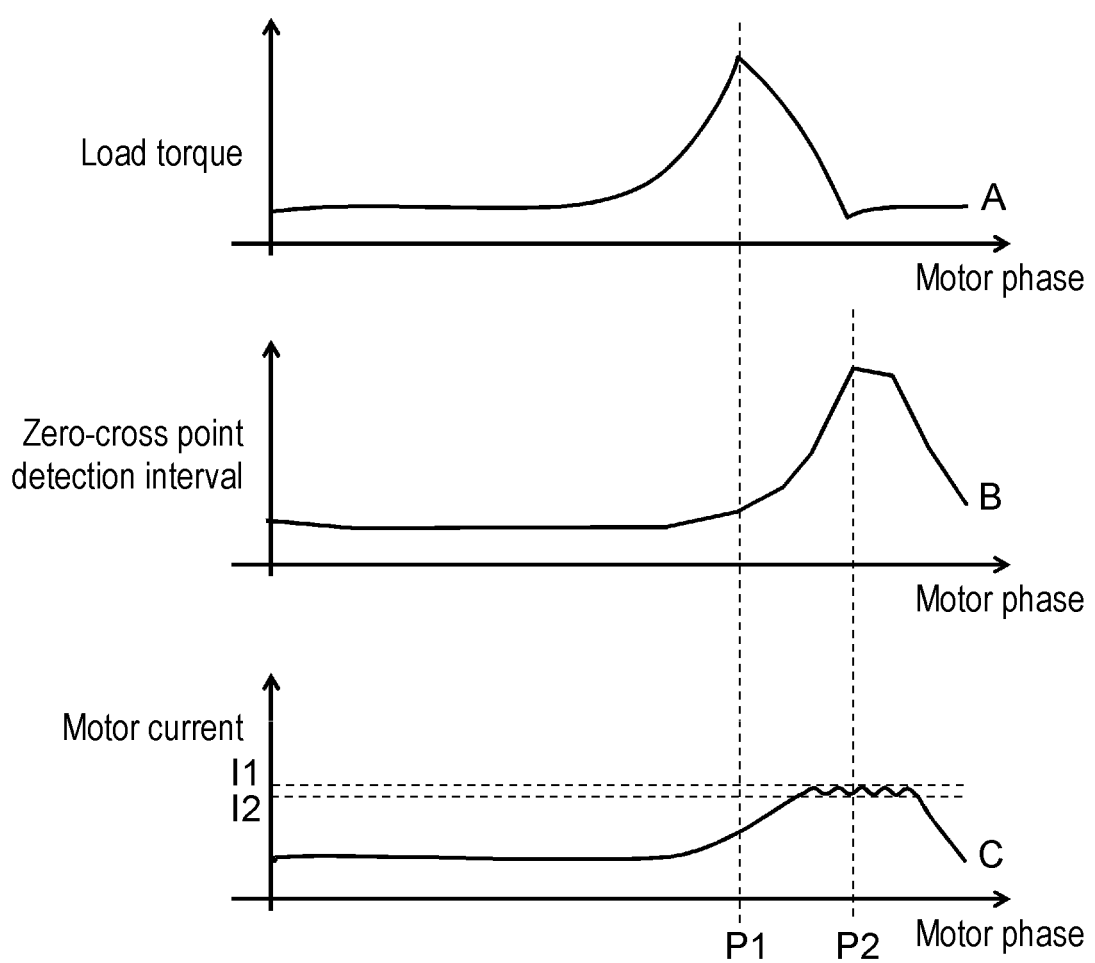
FIG. 9 is a transition diagram showing changes in load torque, zero crossing interval, and motor current with respect to a phase of the brushless DC motor of the motor driving device in the second exemplary embodiment of the present invention.

With reference to FIGS. 7, 8 and 9, a description will be made of operations of refrigerator 22 using motor driving device 82 of this exemplary embodiment, which is configured as described above.

Waveform A in FIG. 8 is a transition diagram showing a change in the load torque with respect to the phase of brushless DC motor 5 when the applied voltage is determined by the speed controller that belongs to the conventional mode. Waveform B in FIG. 8 is a transition diagram showing a change in the zero-cross point interval with respect to the phase of brushless DC motor 5 when the applied voltage is determined by the speed controller that belongs to the conventional mode. Waveform C in FIG. 8 is a transition diagram showing a change in the current value of brushless DC motor 5 with respect to the phase of brushless DC motor 5 when the applied voltage is determined by the speed controller that belongs to the conventional mode.

Waveform A in FIG. 9 is a transition diagram showing a change in the load torque with respect to the phase of brushless DC motor 5 when the applied voltage is corrected by applied voltage changer 80 of this exemplary embodiment. Waveform B in FIG. 9 is a transition diagram showing a change in the zero-cross point interval with respect to the phase of brushless DC motor 5 when the applied voltage is corrected by applied voltage changer 80 of this exemplary embodiment. Waveform C in FIG. 9 is a transition diagram showing a change in the current value of brushless DC motor 5 with respect to the phase of brushless DC motor 5 when the applied voltage is corrected by applied voltage changer 80 of this exemplary embodiment.

In FIG. 8, each axis of abscissas represents a phase of brushless DC motor 5 after brushless DC motor 5 is started and allowed to make one rotation by the conventional start-up method in a state in which the pressure difference between the suction side and discharge side of compressor 17 is equal to or more than 0.05 MPa.

In FIG. 9, each axis of abscissas represents a phase of brushless DC motor 5 after brushless DC motor 5 is started and allowed to make one rotation by the start-up method of this exemplary embodiment in a state in which the pressure difference between the suction side and discharge side of compressor 17 is equal to or more than 0.05 MPa.

Each axis of ordinates in waveform A in FIG. 8 and waveform A in FIG. 9 represents a change in the load torque applied to brushless DC motor 5. Each axis of ordinates in waveform B in FIG. 8 and waveform B in FIG. 9 represents an interval of detecting the zero-cross point to be detected by position detector 76. Each axis of ordinates in waveform C in FIG. 8 and waveform C in FIG. 9 represents the current flowing through brushless DC motor 5.

As shown in waveform A and waveform B in FIG. 8, in the case of performing differential pressure start-up (to start compressor 17 in a state in which the pressure difference between the suction side and discharge side of compressor 17 is equal to or more than 0.05 MPa), both the load torque and such a zero-cross point detection interval change largely. Then, the peak of the increase in the load torque does not coincide with a peak of an actual increase of the zero-cross point detection interval, and there is a response delay in the zero-cross point detection interval with respect to the change in the load torque.

As a result, in a section where a position detection interval is long and the speed is low, necessary torque is small. Therefore, if the voltage to be applied to brushless DC motor 5 is controlled only by speed controller 78 like the conventional start-up, the PWM ON ratio becomes excessive in the section where the speed is low. Then, a large current flows as shown by waveform C in FIG. 8. Since the large current flows, brushless DC motor 5 stops due to demagnetization of brushless DC motor 5, element destruction of inverter 4, overcurrent protection provided for preventing these, and the like. Then, motor driving device 82 cannot be started up.

Meanwhile, in motor driving device 82 of this exemplary embodiment, in a similar way to the conventional start-up as shown in waveform A and waveform B in FIG. 9, the load torque and the zero-cross point detection interval change greatly. Then, the peak of the increase of the load torque and the peak of the actual increase of the zero-cross point detection interval do not coincide with each other, and there is a response delay in the zero-cross point detection interval with respect to the change in the load torque. However, as shown by waveform C in FIG. 9, the PWM ON ratio is controlled to reduce the current when the current exceeds I1 that is the first threshold value and to increase the current when the current falls below I2 that is the second threshold value. Therefore, the current does not flow more than necessary, and there do not occur the stoppage of brushless DC motor 5 due to the demagnetization of brushless DC motor 5, the element destruction of inverter 4, the overcurrent protection, and the like. Accordingly, motor driving device 82 can be started.

Moreover, the reduction of the PWM ON ratio in the section where the speed is slow and the increase of the PWM ON ratio in the section where the speed is fast result in the reduction of the torque in the section where the torque is excessive and the increase of the output torque in the portion where the torque is insufficient. Accordingly, motor driving device 82 can be started while reducing the speed change and reducing the vibration even under the condition where the load torque fluctuation is large.

Figure 10:
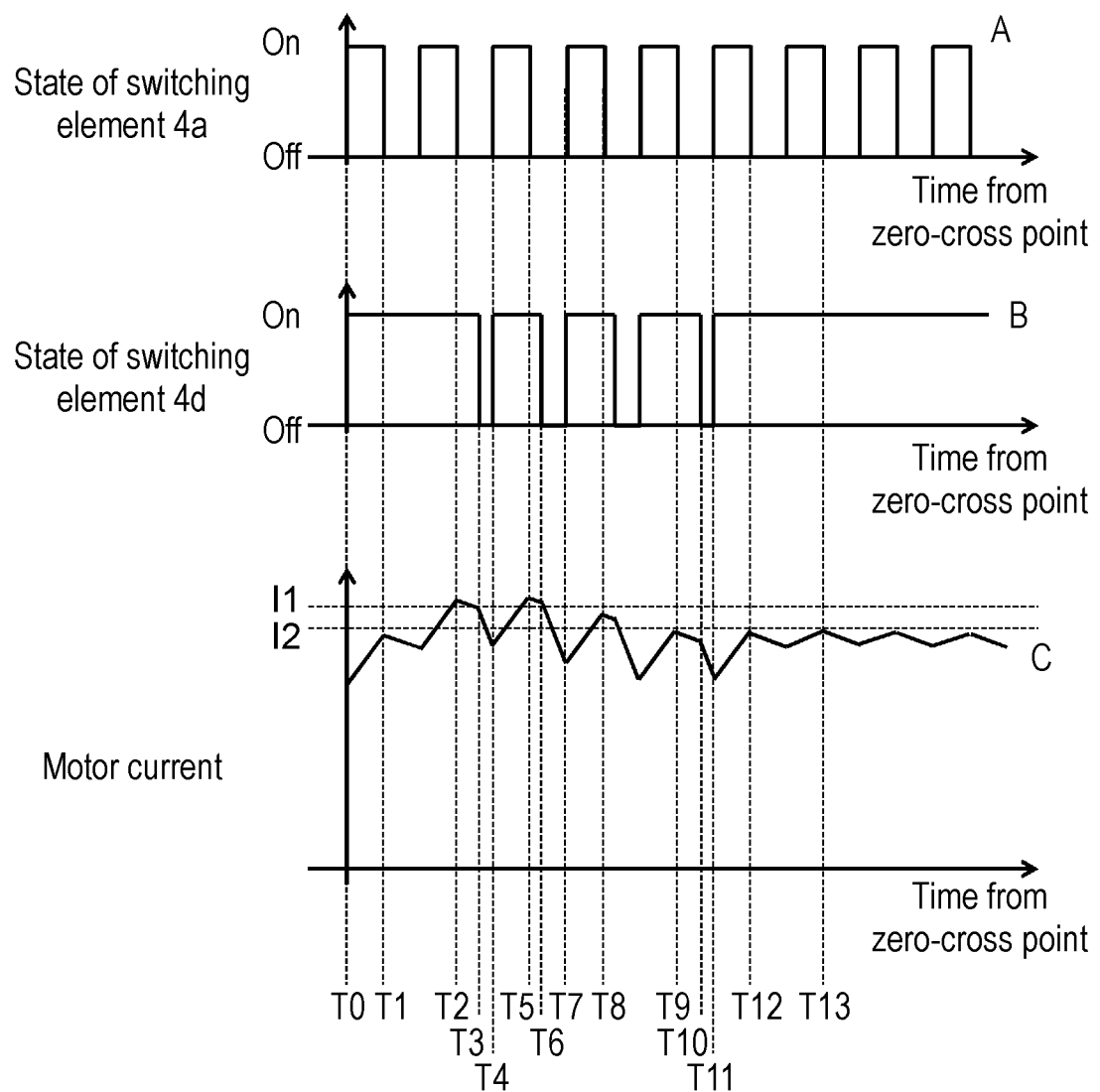
FIG. 10 is a transition diagram showing changes of switching elements and a change of a current of the brushless DC motor with respect to a time of the motor driving device in the second exemplary embodiment of the present invention.

Next, with reference to FIG. 10, a description will be made of a change in the ON ratio of the PWM performed by applied voltage changer 80. Each axis of abscissas in waveform A, waveform B and waveform C in FIG. 10 represents a time from the zero-cross point. An axis of ordinates in waveform A in FIG. 10 represents a state of switching element 4a. An axis of ordinates in waveform B in FIG. 10 represents a state of switching element 4d. An axis of ordinates in waveform C in FIG. 10 represents a value of the current flowing through brushless DC motor 5. It is assumed that, with regard to current detection timing in current detector 79, the current is detected immediately before an ON state of the PWM ends, when the current has a peak value in one carrier. This makes it possible to acquire the peak value of the current, and also has an effect that the detected current is not affected by ringing that appears immediately after the PWM is turned on.

In the case of performing rectangular wave driving, in the conventional method, only the switching element in one phase between the two energized phases is switched, and the switching element in the other phase is not switched, but is turned on for a full time. In FIG. 10, the element that is performing switching is switching element 4a, and the element that is turned on for a full time when it is not necessary to reduce the current is switching element 4d.

At timing T0 to T1, since switching element 4a is turned on, the current increases. A current value at timing T1 does not exceed first threshold value I1, and accordingly, the PWM is not corrected. Moreover, as a result that the current of brushless DC motor 5 increases in the next ON state of switching element 4a, the current value exceeds I1 at timing T2. Therefore, the PWM is corrected, and the PWM ON ratio is changed so as to reduce the applied voltage.

In this exemplary embodiment, the ON ratio of switching element 4a in the phase that is normally switched is not changed, but the ON ratio of switching element 4d that is normally turned on for a full time is changed. Switching element 4d is turned off between timing T3 and timing T4. The current decreases during a period from timing T2 to timing T3 while switching element 4a is turned off and switching element 4d is turned on. However, the current decreases more during a period from timing T3 to timing T4 while both of switching element 4a and switching element 4d are turned off. This occurs due to a difference between a state in which the current flowing through brushless DC motor 5 is refluxed and a state in which brushless DC motor 5 regenerates the current.

When both of switching element 4a and switching element 4d are turned off, and a regenerative state is generated, then a reduction rate of the current is higher, and the current can be suppressed more reliably. In this exemplary embodiment, in order to have a simple configuration, an amount, by which the ON ratio of the PWM is reduced when the current value exceeds IL is fixed. When the amount by which the ON ratio of the PWM is reduced is fixed, it is necessary to confirm a reduction width, by which the current can be certainly suppressed, in advance in an experimental manner or by calculation. When the PI control is used, the configuration becomes complicated; however, it is possible to suppress the current more reliably.

At timing T5, the current increases again, and the current value exceeds I1 as the first threshold value. Therefore, an OFF ratio of switching element 4d is further increased during a period from timing T6 to timing T7 to increase a decreased amount of the current.

At timing T8, the current does not fall below I2 as the second threshold value, and hence, the ON ratio of the PWM is not changed.

At timing T9, the current value falls below I2, and therefore, switching element 4d decreases the OFF ratio and increases the ON ratio during a period from timing T10 to timing T11. This reduces the decreased amount of the current.

Also at timing T12, the current value is lower than I2. Hence, the OFF ratio of switching element 4d is decreased, and the ON ratio of switching element 4d is changed such that switching element 4d is fully turned on.

Also at timing T13, the current value is lower than I2. However, the ON ratio of the PWM in switching element 4d is 100%. Accordingly, the PWM ON ratio is not corrected any more. That is, the voltage is not corrected beyond the applied voltage value determined by speed controller 78.

Figure 11:
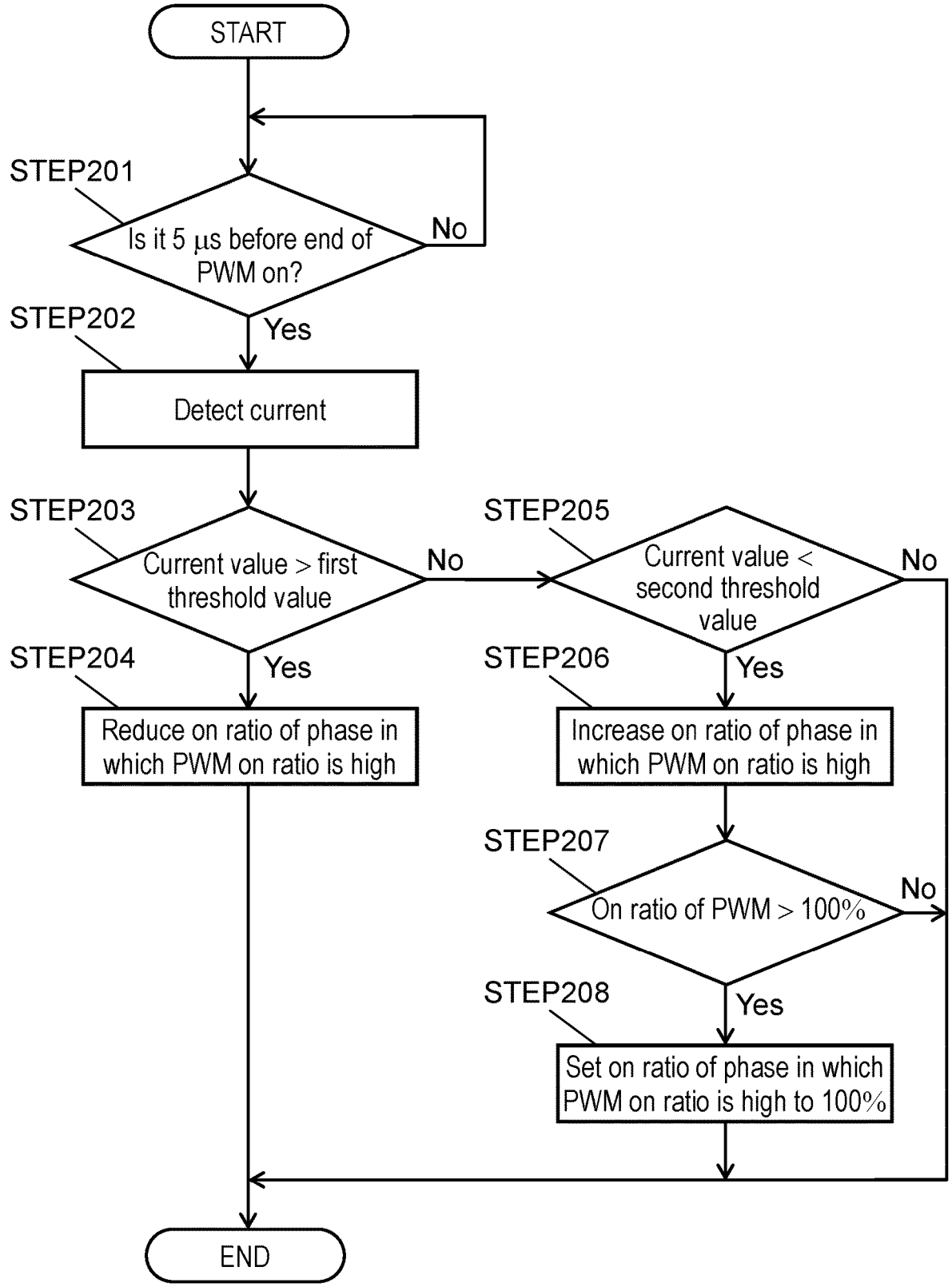
FIG. 11 is a flowchart showing a flow of operations of the motor driving device in the second exemplary embodiment of the present invention.

Next, detailed drive control for motor driving device 82 in this exemplary embodiment will be described with reference to FIG. 11. In particular, details of current detector 79 and applied voltage changer 80 will be described.

First, in STEP 201, current detector 79 determines whether or not it is 5 μs before the ON state of the PWM ends (whether or not 5 μs is left before the ON state of the PWM ends). If it is 5 μs before, then the process proceeds to STEP 202, and if it is earlier than 5 μs, then the process proceeds again to STEP 201. The time of 5 μs is a time for ensuring a time required to detect the current while the PWM is on. If a time required by an analog-to-digital conversion circuit mounted on a microcomputer or the like is 1 μs, then 1 μs is sufficient. Here, it is determined that the PWM timer has just started, and the process proceeds to STEP 201.

Again, in STEP 201, it is assumed that a certain period of time has elapsed and that it is 5 μs before the ON of the PWM ends. When it is 5 μs before the ON of the PWM ends, the process proceeds to STEP 202.

In STEP 202, current detector 79 detects the current value of the DC bus of inverter 4, and the process proceeds to STEP 203.

In STEP 203, applied voltage changer 80 compares whether or not the current value detected in STEP 202 is larger than the predetermined first threshold value. If the detected current value is larger as a result of the comparison described above, then the process proceeds to STEP 204, and otherwise, the process proceeds to STEP 205. Here, it is determined that the current value is larger than the first threshold value, and the process proceeds to STEP 204.

In STEP 204, applied voltage changer 80 reduces the ON ratio of the phase having a high PWM ON ratio. Here, when switching element 4a and switching 4d are controlled to supply the current to brushless DC motor 5, then the ON ratio of the PWM, which is determined based on the applied voltage determined by speed controller 78, is set to the ON ratio of the PWM for switching element 4a. That is, when the PWM is not corrected by applied voltage changer 80, only switching element 4a is switched, and switching element 4d is turned on for the full time. Here, the phase having a high PWM ON ratio is usually switching element 4d that is turned on for the full time. The PWM ON ratio of switching element 4d is reduced by a certain amount. Then, the processing is terminated.

Meanwhile, if the current value detected in STEP 202 is equal to or less than the first threshold value in STEP 203, the process proceeds to STEP 205.

In STEP 205, applied voltage changer 80 determines whether or not the current value detected in STEP 202 is smaller than the second threshold value. If the current value is smaller than the second threshold value, then the process proceeds to STEP 206, and otherwise, the process is terminated. Here, it is determined that the current value is smaller than the second threshold value, and the process proceeds to STEP 206.

In STEP 206, applied voltage changer 80 increases the ON ratio of the phase having a high ON ratio of the uncorrected PWM. As in STEP 204, switching element 4d is an object. Then, the process proceeds to STEP 207.

In STEP 207, applied voltage changer 80 determines whether or not the PWM ON ratio, which is corrected in STEP 206, exceeds 100%. If the PWM ON ratio exceeds 100%, then the process proceeds to STEP 208, and otherwise, that is, if the PWM ON ratio is equal to or less than 100%, then the process is terminated. Here, it is determined that the PWM ON ratio exceeds 100%, and the process proceeds to STEP 208.

In STEP 208, since the PWM ON ratio of the phase corrected in STEP 206 exceeds 100% by calculation, applied voltage changer 80 changes the PWM ON ratio to 100%. Then, the processing is terminated.

Meanwhile, in STEP 205, if the current value detected in STEP 202 is equal to or larger than the second threshold value, then the process is terminated. That is, such a correction amount of the PWM ON ratio PWM is maintained as it is.

Moreover, in STEP 207, if the PWM ON ratio is 100% or less as a result of the correction performed in STEP 206, then the process is terminated. That is, applied voltage changer 80 determines such an amount of the correction for the PWM ON ratio, the correction being performed in STEP 206.

Performing and completing the above-described operations in one cycle of the PWM are repeatedly conducted every cycle. In this way, even if the load driven by brushless DC motor 5 fluctuates greatly, it is possible to suppress the current of brushless DC motor 5 and start motor driving device 82.

Moreover, it is also unnecessary to use a large-capacity element in order to prevent breakdown of inverter 4, or to use a low-efficiency brushless DC motor in order to increase a demagnetizing limit current of brushless DC motor 5.

Here, a detailed description will be made of a relationship between the efficiency and demagnetizing limit current of brushless DC motor 5. The number of turns of stator 5b is increased, whereby torque obtained by the same current is increased, and the current required to output necessary torque is reduced. Therefore, the efficiency of brushless DC motor 5 is improved. However, since magnetic force of demagnetization in which magnetic force of the permanent magnet in rotor 5a is irreversibly reduced does not change, the demagnetizing limit current which is a limit current that does not cause the demagnetization of rotor 5a decreases as the number of turns of stator 5b increases. That is, in order to make a large current flow, a large demagnetizing limit current is required. This leads to the use of a low-efficiency motor.

Furthermore, there is a problem that overcurrent protection provided to prevent these problems sometimes causes brushless DC motor 5 to stop driving, and so on. However, in this exemplary embodiment, the first threshold value is set to a value sufficiently lower than these overcurrent protection and demagnetization current. Accordingly, even in a state of large load fluctuations, motor driving device 82 can be started while adopting a relatively low-capacity element for inverter 4 and while adopting a high-efficiency motor.

When the applied voltage is not changed in response to the speed in one rotation of brushless DC motor 5 but is monotonically increased for the acceleration in a state in which the pressure difference between the suction side and the discharge side in compressor 17 is equal to or larger than 0.05 MPa, the load torque fluctuates greatly due to the pressure difference, and the speed fluctuation increases. Therefore, the vibrations increase, and there is a problem of an increase in possibility of a failure due to abrasion of components of compressor 17. However, suppression of the current of brushless DC motor 5 to the first threshold value or less reduces the PWM ON ratio in a section where the speed is low. Therefore, the reliability can be greatly improved as compared with the conventional application method.

The next will describe a case in which motor driving device 82 according to this exemplary embodiment is used for refrigerator 22 and is allowed to drive compressor 17.

Even when the internal temperature of refrigerator 22 rises before the lapse of 10 minutes from the stoppage until the pressures are balanced, then in the conventional case, compressor 17 has been able to be started only when the pressure difference between the suction side and discharge side of compressor 17 is 0.05 MPa or less. Therefore, it has been necessary to wait for the lapse of 10 minutes. Meanwhile, refrigerator 22 on which motor driving device 82 of this exemplary embodiment is mounted is configured such that motor driving device 82 is capable of being started even at a differential pressure of 0.05 MPa or more. Therefore, it is possible to start motor driving device 82 at timing when the refrigerator temperature rises and it is necessary to operate compressor 17. In this way, the power for providing the pressure difference between condenser 19 and evaporator 21 can be reduced in comparison with the case where motor driving device 82 is started after waiting until the pressure difference between the suction side and discharge side of compressor 17 is balanced. Therefore, energy saving can be achieved.

Moreover, two-way valve 18 is provided between compressor 17 and condenser 19. At the starting time of compressor 17, two-way valve 18 is opened to cause compressor 17 and condenser 19 to communicate with each other. At the time of stoppage of compressor 17, two-way valve 18 is closed to close a space between compressor 17 and condenser 19. With this configuration, the difference between the suction pressure and the discharge pressure can be kept large even during the stoppage of compressor 17. This further increases an energy saving effect by starting motor driving device 82 from a state in which there is a pressure difference. Furthermore, in comparison with the case of using the four-way valve, in the case of using the two-way valve, the system configuration does not become complicated. Therefore, the system can be constructed at lower cost.

As mentioned above, motor driving device 82 according to this exemplary embodiment includes: brushless DC motor 5 that drives the load fluctuating largely; and speed controller 78 that determines the voltage to be applied to brushless DC motor 5 and adjusts the speed. Moreover, motor driving device 82 includes: current detector 79 that detects the current flowing through brushless DC motor 5; applied voltage changer 80 that reduces the applied voltage, which is determined by speed controller 78, when the current detected by current detector 79 is larger than the first threshold value; and driver 81 that drives brushless DC motor 5 with the applied voltage determined by applied voltage changer 80. With such a configuration, the current rise is suppressed, and motor driving device 82 can be started. This current rise is caused by that the increase in the load reduces the speed and induced voltage of brushless DC motor 5 to increase the difference between the induced voltage and the applied voltage. Therefore, motor driving device 82 can be started without using the four-way valve or the like even in a state in which there is a pressure difference. Moreover, it is possible to achieve energy saving by the use of a high-efficiency motor with a small demagnetization current and to achieve a reduction in cost by the use of an element with a small current rating.

Furthermore, in motor driving device 82 of this exemplary embodiment, when the current detected by current detector 79 is smaller than the second threshold value, applied voltage changer 80 raises the voltage to an upper limit of the applied voltage determined by speed controller 78. In this way, in a section in which the required torque is small and the speed is slow, excessive output torque is suppressed, whereas the output torque is increased in a section in which the torque is insufficient and the speed is high. With such a configuration, even under the condition where the load torque fluctuation is large, motor driving device 82 can be started while decreasing the speed change and reducing the vibration.

Moreover, in motor driving device 82 of this exemplary embodiment, driver 81 performs the PWM control in order to adjust the voltage to be applied to brushless DC motor 5. Moreover, speed controller 78 determines the PWM ON ratio in order to determine the voltage to be applied, and reduces the PWM ON ratio determined by speed controller 78 in order to reduce the voltage to be applied by applied voltage changer 80. With such a configuration, with a simple control, brushless DC motor 5 can be started in a state in which there is a large fluctuation in the load torque. Accordingly, an inexpensive motor driving device can be provided.

Moreover, in motor driving device 82 according to this exemplary embodiment, when applied voltage changer 80 reduces the PWM ON ratio, at least a period for turning off all the energization is provided. In this way, brushless DC motor 5 is brought into a regenerative state, and the reduction rate of the current becomes larger than that in the reflux state. Therefore, it is possible to suppress the current more reliably.

Moreover, motor driving device 82 of this exemplary embodiment includes compressor 17 in which brushless DC motor 5 is incorporated. The load to be driven by brushless DC motor 5 is a compression element (crankshaft, piston or the like) of compressor 17. In this way, motor driving device 82 can be started even in a state in which the pressure difference remains in compressor 17, and in which a large load torque fluctuation exists from the start. Therefore, motor driving device 82 can be started without monitoring the state of compressor 17, thus making it possible to construct an inexpensive system.

Moreover, in refrigerator 22 mounted with motor driving device 82 of this exemplary embodiment, compressor 17 constructs a refrigeration cycle in which the constituents are connected to one another in order of compressor 17, condenser 19, decompressor 20, evaporator 21 and compressor 17. Motor driving device 82 is started in a state in which the pressure difference between the suction side and discharge side of compressor 17 remains. This configuration allows motor driving device 82 to start even in a state in which there is a pressure difference between the suction side and discharge side of compressor 17, thereby making it possible to reduce an energy loss in the refrigeration cycle without raising a temperature of evaporator 21 with a simple system configuration at low cost.

Furthermore, even if a power failure occurs during operation of compressor 17 and power recovery is achieved before the pressures on the suction side and discharge side of compressor 17 are balanced, compressor 17 can be immediately started up, thus quickly providing cooling to the inside of refrigerator 22 even in a bad power supply condition where power fails frequently.

Moreover, in refrigerator 22 mounted with motor driving device 82 of this exemplary embodiment, the pressure difference generated between the suction side and discharge side of compressor 17 is at least 0.05 MPa or more. This can reduce an energy loss in the refrigeration cycle while reducing a progress of deterioration due to the increase in vibration and maintaining reliability of compressor 17.

Third Exemplary Embodiment

Figure 12:
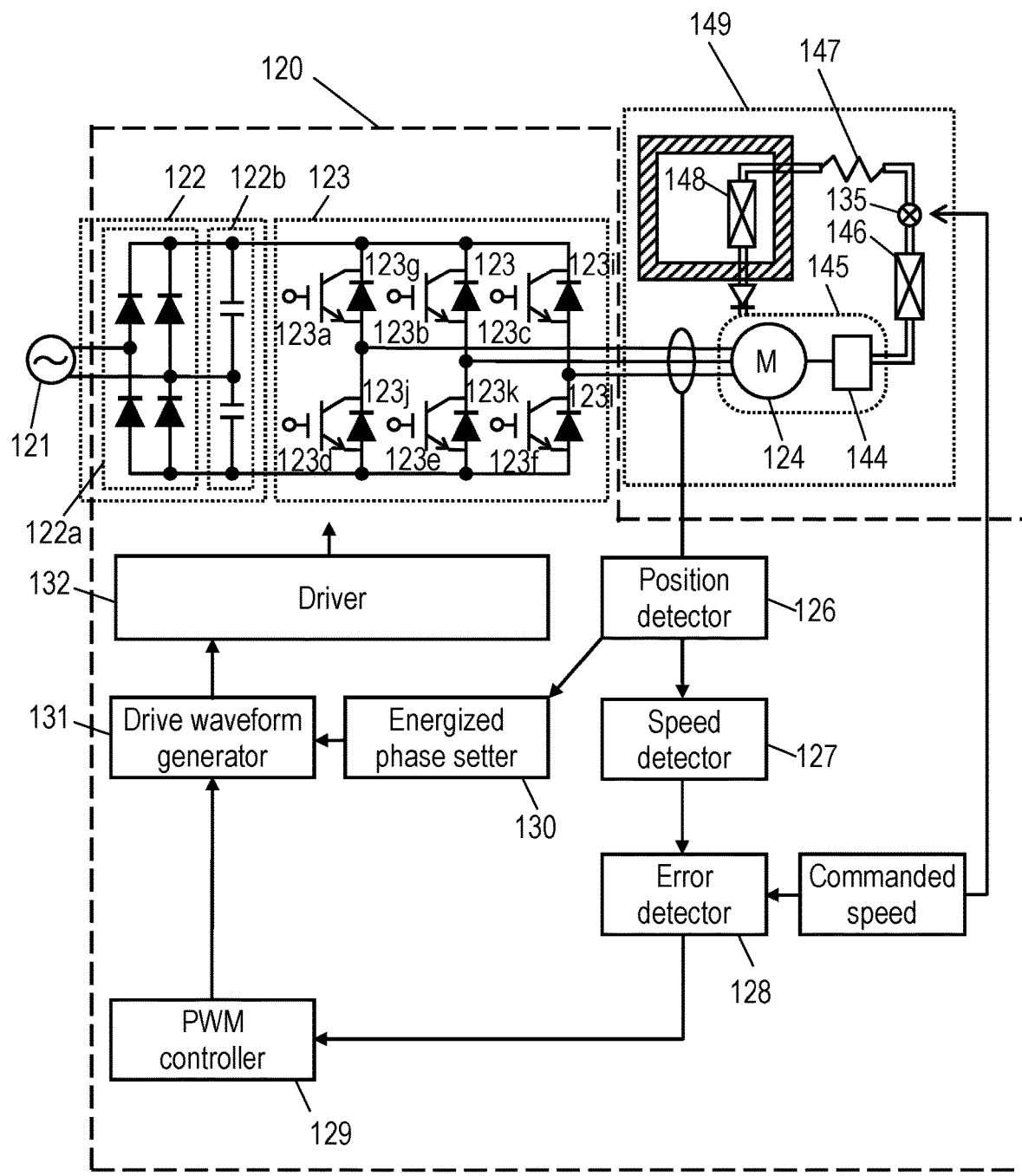
FIG. 12 is a block diagram showing a motor driving device in a third exemplary embodiment of the present invention.

FIG. 12 is a block diagram showing motor driving device 120 in a third exemplary embodiment of the present invention.

In FIG. 12, power source 121 is a general commercial power source, and in the case of Japan, is an AC power source of 50 Hz or 60 Hz with an effective value of 100 V. Rectifying/smoothing circuit 122 is composed of rectifier 122a and smoother 122b, and receives power from AC power source 121, and converts an AC voltage into a DC voltage. Although rectifying/smoothing circuit 122 in this exemplary embodiment has a voltage doubler rectification configuration, rectifying/smoothing circuit 122 may have a full-wave rectification configuration, a configuration that switches between such full-wave rectification and such doubled voltage rectification, a power factor correction circuit (PFC), or the like.

In inverter 123, six switching elements 123a to 123f are connected to one another in a three-phase full bridge configuration. Inverter 123 converts a DC input from rectifying/smoothing circuit 122 into AC power, and supplies the AC output with arbitrary voltage and frequency to brushless DC motor 124. Diodes 123g to 123l are connected to switching elements 123a to 123f in parallel in a reverse direction, respectively. Note that FIG. 12 shows an example in which the switching elements are composed of insulated-gate bipolar transistors (IGBTs); however, metal oxide semiconductor field-effect transistors (MOSFETs), bipolar transistors, silicon carbide (SiC) devices, gallium nitride (GaN) devices or the like may be used.

Position detector 126 detects a magnetic pole position of a rotor of brushless DC motor 124. Position detector 126 detects, as a position signal, a zero-cross point of an induced voltage, which appears at a terminal to which a stator winding through which no current flows is connected, from the induced voltage.

Speed detector 127 detects a driving speed of brushless DC motor 124 from an output signal interval of position detector 126. Error detector 128 detects a difference between the driving speed obtained by speed detector 127 and a commanded speed.

PWM controller 129 adjusts a voltage, which is supplied to brushless DC motor 124 by inverter 123, from the difference between the commanded speed and the actual driving speed obtained from error detector 128. Specifically, switching elements 123a to 123f of inverter 123 are turned on or off at an arbitrary frequency by pulse width modulation (PWM), and an ON time (duty) per ON or OFF cycle is adjusted. The duty is adjusted and determined by feedback control such that the actual driving speed of the brushless DC motor coincides with the commanded speed as a target.

Based on the position signal obtained by position detector 126 and on timing of the detection, energized phase setter 130 sets an energization pattern and energization timing of a winding to be energized next. In addition, energized phase setter 130 adds a pattern for returning energy of a motor winding, to which the voltage application is cut off by commutation, as regenerative energy to a power supply side (that is, smoother 122b), and then outputs those settings to drive waveform generator 131.

Note that the energization pattern to the winding, which is set by energized phase setter 130, is set such that a rectangular wave with 120 degrees or more and 150 degrees or less or a waveform similar thereto becomes a waveform with a predetermined frequency.

Drive waveform generator 131 synthesizes the energization pattern and energization timing of the three-phase winding of brushless DC motor 124, which are provided by energized phase setter 130, with the PWM frequency and the ON time, which are set by PWM controller 129. In this way, drive waveform generator 131 generates drive waveforms for turning on or off respective switching elements 123a to 123f of inverter 123, and outputs the generated drive waveforms to driver 132.

Driver 132 turns on or off respective switching elements 123a to 123f of inverter 123 based on the drive waveforms generated by drive waveform generator 131.

Figure 13:
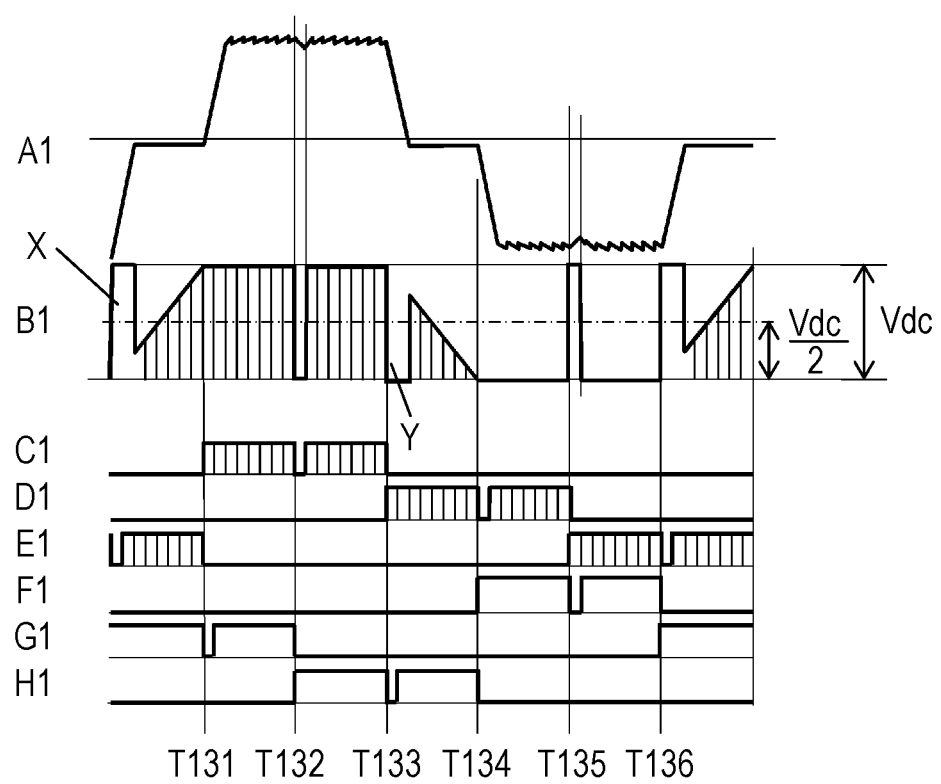
FIG. 13 is a diagram showing waveforms of respective units of the motor driving device in the third exemplary embodiment of the present invention when the motor is driven.

FIG. 13 shows the waveforms of the respective units at the time of driving by motor driving device 120 of this exemplary embodiment.

In FIG. 13, waveform A1 represents a current waveform of the current flowing through the motor winding, and waveform B1 represents a motor terminal voltage. Both waveforms A1 and B1 are waveforms of the U phase. Waveforms C1 to H1 represent drive waveforms of respective switching elements 123a to 123f of inverter 123 by driver 132.

Timings indicated by T131 to T136 are commutation timings at which the motor windings to be energized are switched. At each of the commutation timings, drive waveform generator 131 synthesizes: the output set by energized phase setter 130 in accordance with the energization pattern of the three-phase winding of brushless DC motor 124; the output waveform by PWM controller 129 based on the feedback control; and the pattern for returning the energy, which is stored and acquired in the winding, as regenerative energy to the power source side (electrolytic capacitor). Then, drive waveform generator 131 outputs a resultant of the synthesis to driver 132.

A specific description will be made of the pattern for returning the winding energy during the commutation, which is generated by energized phase setter 130, to the power source side with reference to FIG. 12, FIG. 13 and FIGS. 14A to 14D.

Figure 14A:
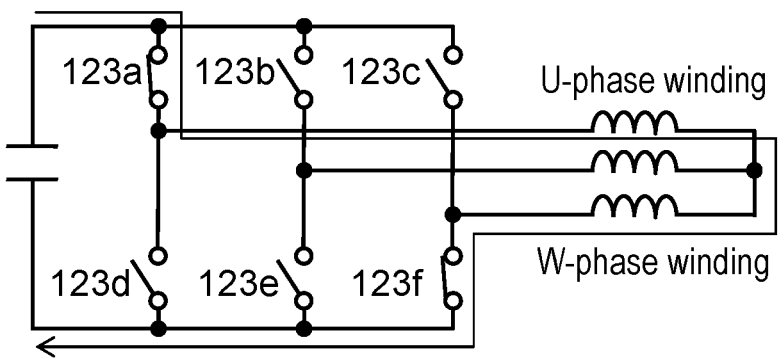
FIG. 14A is a diagram showing a path through which a current flows according to a state of switching elements of the motor driving device in the third exemplary embodiment of the present invention.

In FIG. 13, immediately before timing T133 as the commutation timing, switching elements 123a and 123f are in the ON state. As shown in FIG. 14A, a motor current is in a power running state of sequentially passing through switching element 123a, the U-phase winding, the W-phase winding and switching element 123f and returning to the power source side.

Figure 14B:
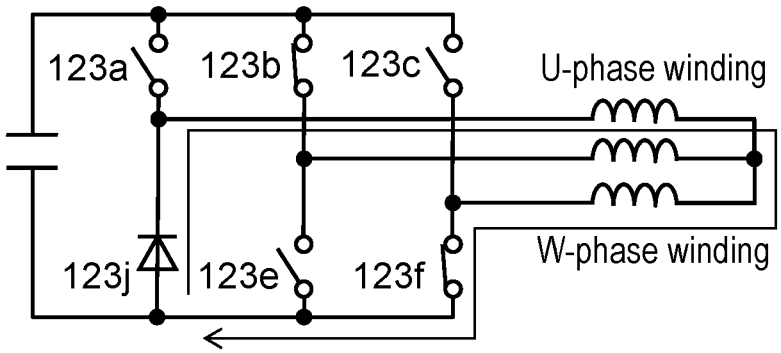
FIG. 14B is a diagram showing a path through which the current flows according to another state of the switching elements of the motor driving device in the third exemplary embodiment of the present invention.

Next, when switching element 123a is turned off and switching element 123b is turned on by the commutation at timing T133, then in usual, as shown in FIG. 14B, diode 123j is made conductive, and energy stored in the U-phase winding is refluxed and consumed in a closed circuit composed of diode 123j, the U-phase winding, the W-phase winding, and switching element 123f.

Figure 14C:
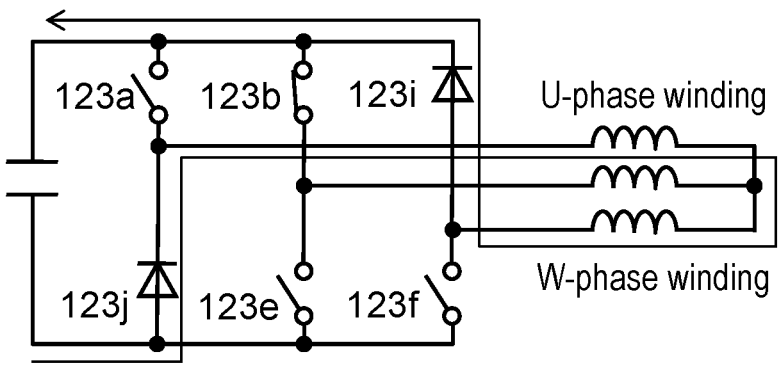
FIG. 14C is a diagram showing a path through which the current flows according to still another state of the switching elements of the motor driving device in the third exemplary embodiment of the present invention.

However, in this exemplary embodiment, as shown in FIG. 14C, simultaneously with the commutation timing, W-phase lower switching element 123f is turned off for an arbitrary period. At this time, the energy stored in the U-phase winding makes diode 123j and diode 123i conductive, and returns as generative energy to the power source (charging current of the smoothing capacitor).

Figure 14D:
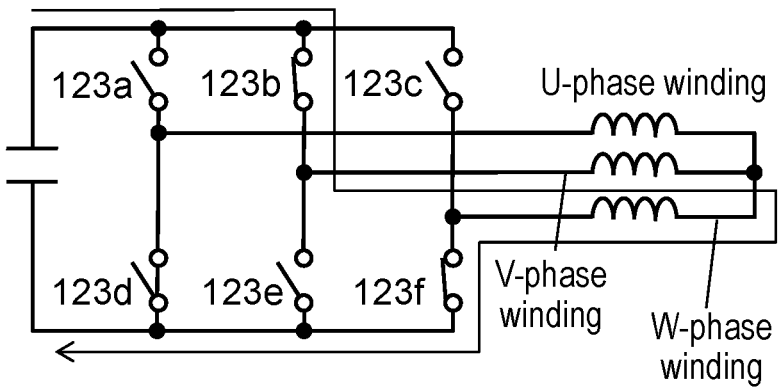
FIG. 14D is a diagram showing a path through which the current flows according to yet another state of the switching elements of the motor driving device in the third exemplary embodiment of the present invention.

Thereafter, as shown in FIG. 14D, switching element 123f is turned on again. Then, the motor current returns to the power running state of sequentially passing through switching element 123b, the V-phase winding, the W-phase winding, and switching element 123f and returning to the power source side.

As described above, the pattern for returning the winding energy at the time of commutation as regenerative energy is a pattern in which the switching element in the phase of the winding, which continues to be energized even after the commutation among the windings energized until immediately before the commutation, is temporarily turned off. As described at commutation timing T133, switching element (that is, 123f) in the phase of the winding that continues to be energized even after the commutation (that is, the W phase) among the windings energized until immediately before the commutation (that is, the U-phase winding and the W-phase winding) is temporarily turned off.

When the energy stored in the winding is released, such a current of the winding becomes zero. A time until the current becomes zero is extremely short in charging the capacitor of smoother 122b in a regenerative mode in comparison with a reflux mode in which the energy is consumed by the circuit and impedance of the winding.

Therefore, in this exemplary embodiment in which the energy in the winding is released as regenerative energy, the current of the winding due to the commutation is turned off in a short time. Therefore, even at the time of driving when a large current flows due to high-torque drive, the current of the winding becomes zero before timing at which the zero-cross point of the induced voltage occurs, and the zero-cross can be reliably detected without being covered with a spike voltage. Accordingly, it is possible to accurately detect the magnetic pole position of the rotor. In this way, high torque driving performance at the time of starting and so on can be realized, and driving performance at the time when a high load is applied, the driving performance including startability of brushless DC motor 124, can be enhanced.

Note that, in the description of this exemplary embodiment, with regard to the pattern for returning such winding energy as regenerative energy to the power source side, the method of stopping the energization of the switching element for a certain period is described with reference to FIG. 13. However, the following configuration may be adopted: a configuration in which the switching element is turned on or off at a high frequency; and a configuration in which the switching element is turned on and off a predetermined number of times in synchronization with PWM switching.

Next, a description will be made of refrigerator 149 mounted with the compressor driven by motor driving device 120. This exemplary embodiment can be applied not only to the refrigerator but also to a freezer and the like.

In FIG. 12, compression element 144 is connected to a shaft of the rotor of brushless DC motor 124, and sucks, compresses, and discharges refrigerant gas. Brushless DC motor 124 and compression element 144 are housed in the same hermetically sealed container to constitute compressor 145. Such a refrigeration air conditioning system is composed, in which the discharge gas compressed by compressor 145 passes through condenser 146, decompressor 147 and, evaporator 148 and returns to compressor 145. Heat is radiated in condenser 146, and heat is absorbed in evaporator 148, and accordingly, cooling and heating can be performed. Note that blowers or the like may be provided for condenser 146 and evaporator 148 according to needs, thus also making it possible to further promote the heat exchange. Moreover, in this exemplary embodiment, the refrigeration air conditioning system is used as a refrigeration cycle of refrigerator 149.

In the refrigeration cycle of refrigerator 149, capillary tubes are frequently used for decompressor 147. Since an inner tube diameter of the capillary tubes is extremely small, it takes time to balance the pressures of the suction side and discharge side of compressor 145 when compressor 145 is stopped. Hence, when compressor 145 is stopped due to an instantaneous power failure or the like at the time when compressor 145 is driven, it is necessary to restart compressor 145 promptly from a state in which the pressure difference between the suction side and discharge side of compressor 145 is large.

Large starting torque is required to start compressor 145 in a state in which the pressure balance is not achieved, and this makes it difficult to start compressor 145. However, even in a state in which the pressure difference between the suction side and the discharge side is large, compressor 145 can be stably started by using motor driving device 120 of this exemplary embodiment for driving compressor 145.

Hence, even when compressor 145 is temporarily stopped due to an occurrence of an instantaneous power failure or the like, it is unnecessary to wait for the start-up until the pressure balance of compressor 145 is balanced at the time of recovery from the power failure, and compressor 145 can be promptly restarted. Therefore, the increase in the internal temperature of refrigerator 149 can be suppressed.

Refrigerant flow rate adjuster 135 opens and shuts off a refrigerant flow path between condenser 146 and evaporator 148 of the refrigeration cycle. In this exemplary embodiment, refrigerant flow rate adjuster 135 is installed between condenser 146 and decompressor 147, but may be installed between decompressor 147 and evaporator 148.

Here, operations of refrigerant flow rate adjuster 135 will be described. Refrigerant flow rate adjuster 135 operates in conjunction with the operation or stoppage of compressor 145. Refrigerant flow rate adjuster 135 is configured to open the refrigerant flow path during the operation of compressor 145, and to close the refrigerant flow path during the stoppage of compressor 145. That is, when there is an instruction to drive brushless DC motor 124 (that is, when a commanded speed is not zero), then in order to cool the inside of the refrigerator, the refrigerant flow path is opened by refrigerant flow rate adjuster 135 such that the refrigerant can be circulated in the refrigeration cycle by the operation of the compressor. When compressor 145 is stopped (that is, when a stop instruction is issued to brushless DC motor 124), the refrigerant flow path is closed by refrigerant flow rate adjuster 135, and the flow of the refrigerant between condenser 146 and evaporator 148 is shut off.

In the refrigeration cycle of refrigerator 149, condenser 146 is connected to the discharge (high pressure) side of compressor 145, and evaporator 148 is connected to the suction (low pressure) side of compressor 145. Therefore, during the operation of compressor 145, a pressure difference is generated between condenser 146 and evaporator 148. In order to balance the pressures of both of condenser 146 and evaporator 148 after compressor 145 stops, high-temperature and high-pressure gas refrigerant of condenser 146 flows into evaporator 148 through decompressor 147, and is condensed and liquefied in the inside of evaporator 148. That is, such a high-temperature gas refrigerant flows into evaporator 148 installed in refrigerator 149 in a cooled state, and there, heat is exchanged (thermal energy is released). This results in a thermal load of refrigerator 149, which is therefore a reason for increase of power consumption of refrigerator 149.

Meanwhile, this exemplary embodiment is configured such that, when compressor 145 is stopped, the high-temperature and high-pressure gas from a side of condenser 146 does not flow into evaporator 148 in such a manner that the refrigerant flow path is closed by refrigerant flow rate adjuster 135. With such a configuration, energy saving performance of the refrigeration cycle using compressor 145 and of refrigerator 149 is enhanced.

Moreover, when compressor 145 is started from a state in which the pressure on the suction side of compressor 145 and the pressure on the discharge side of compressor 145 are balanced, then a loss of energy in the refrigeration cycle occurs during the following period after the start-up. In the period, the pressure on the side of condenser 146 is lowered to a predetermined pressure, the pressure on the discharge side is raised to a predetermined pressure, and compressor 145 returns to such a stable pressure state during the operation.

Meanwhile, in refrigerator 149 of this exemplary embodiment, when compressor 145 is stopped, the refrigerant flow path is closed by refrigerant flow rate adjuster 135, and the high pressure side (discharge side) and suction side (low pressure side) of compressor 145 are divided from each other. Accordingly, compressor 145 has a pressure difference between the discharge side and the suction side, which is equivalent to that during the operation, even while compressor 145 is being stopped. Moreover, refrigerator 149 of this exemplary embodiment is configured such that compressor 145 is restarted while the pressure on the suction side and the pressure on the discharge side remain equivalent to those in the operating state of compressor 145.

Extremely large starting torque is required to start compressor 145 in such a state in which the pressure difference is generated between the suction side and discharge side of compressor 145 in comparison with the start-up from a state in which the pressure on the suction side and the pressure on the discharge side are balanced. However, in refrigerator 149 of this exemplary embodiment, large starting torque can be generated by using motor driving device 120 described above for driving compressor 145. Hence, compressor 145 can be started stably and smoothly even if compressor 145 is started in such a state in which a large pressure difference is generated between the suction side and discharge side of compressor 145. Hence, in a short time after being started, compressor 145 can be returned to the stable pressure state during the operation, the loss in the refrigeration cycle at the time of starting can be reduced, and the power consumption of refrigerator 149 can be reduced.

Fourth Exemplary Embodiment

Figure 15:
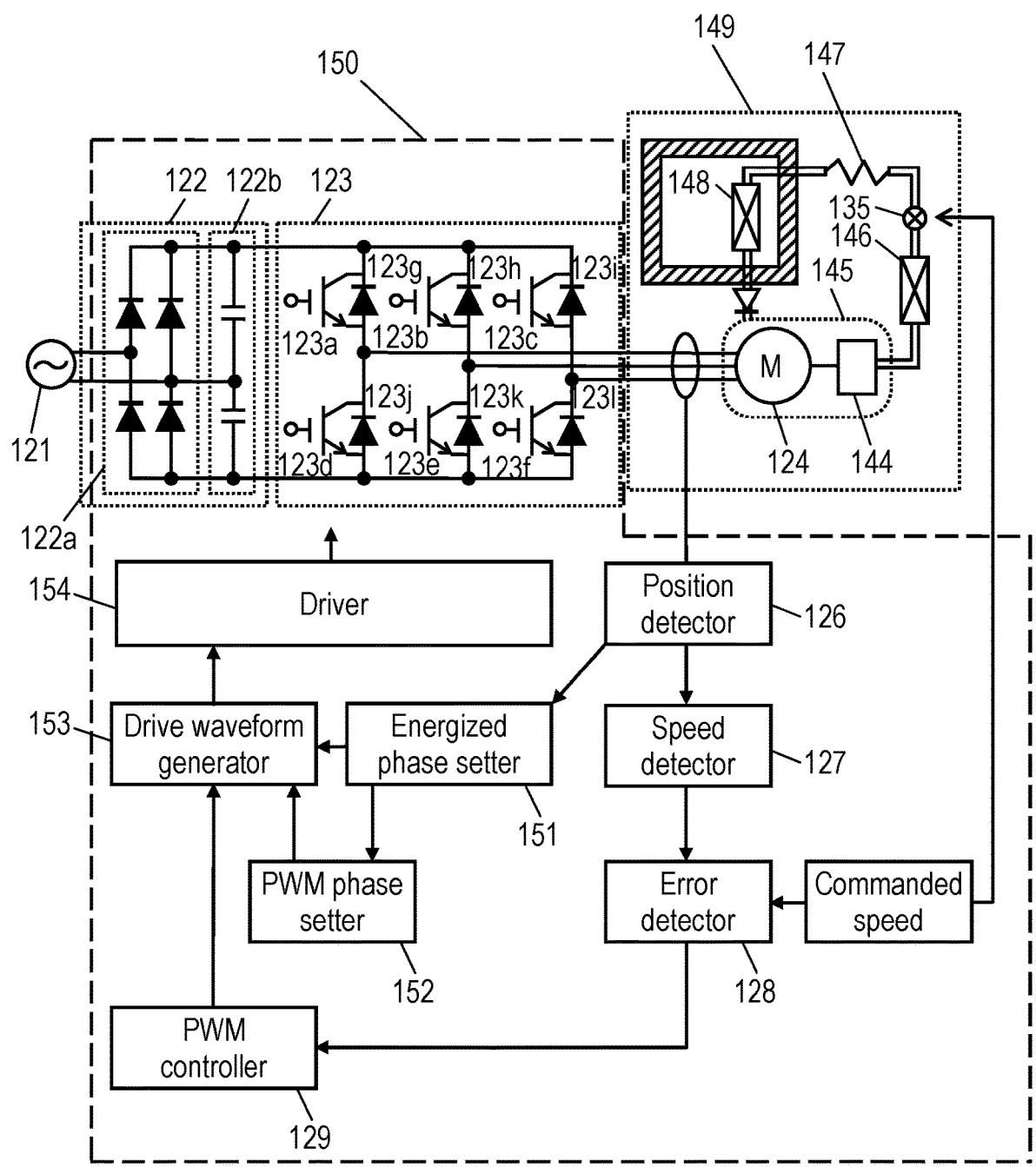
FIG. 15 is a block diagram showing a motor driving device in a fourth exemplary embodiment of the present invention.

FIG. 15 is a block diagram showing motor driving device 150 in a fourth exemplary embodiment of the present invention. Constituents in FIG. 15, which are the same as those in motor driving device 120 of the third exemplary embodiment shown in FIG. 12, are denoted by the same reference numerals, and a description thereof is omitted.

In motor driving device 150 in the fourth exemplary embodiment of the present invention, energized phase setter 151 sets an energization pattern and energization timing of a winding, which is to be energized next, based on a position signal obtained by position detector 126 and on detection timing of the position signal. Then, energized phase setter 151 outputs the set energization pattern and energization timing to drive waveform generator 153 and PWM phase setter 152.

Note that the energization pattern to the winding, which is set by energized phase setter 151, is set such that a rectangular wave with 120 degrees or more and 150 degrees or less or a waveform similar thereto becomes a waveform with a predetermined frequency.

PWM phase setter 152 sets which element among switching elements 123a to 123f of inverter 123 is to be turned on or off under PWM control. That is, PWM phase setter 152 selects a phase (switching element) to be PWM-controlled such that the energy of the winding to which supply of power is interrupted by the commutation is returned as regenerative energy to the power source (capacitor) side.

Drive waveform generator 153 synthesizes: an energized phase pattern of the brushless DC motor, which is set by energized phase setter 151; a switching frequency and an ON time per cycle, which are set by PWM controller 129 and follow PWM control; and the phase (switching element) to be turned on or off under the PWM control, the phase being set by PWM phase setter 152. In this way, drive waveform generator 153 generates a drive waveform of each of the elements in inverter 123.

Driver 154 turns on or off each of switching elements 123a to 123f of inverter 123 based on the drive waveform generated by drive waveform generator 153, thereby driving inverter 123.

Here, a description will be made of operations of PWM phase setter 152 with reference to FIGS. 15 and 16.

Figure 16:
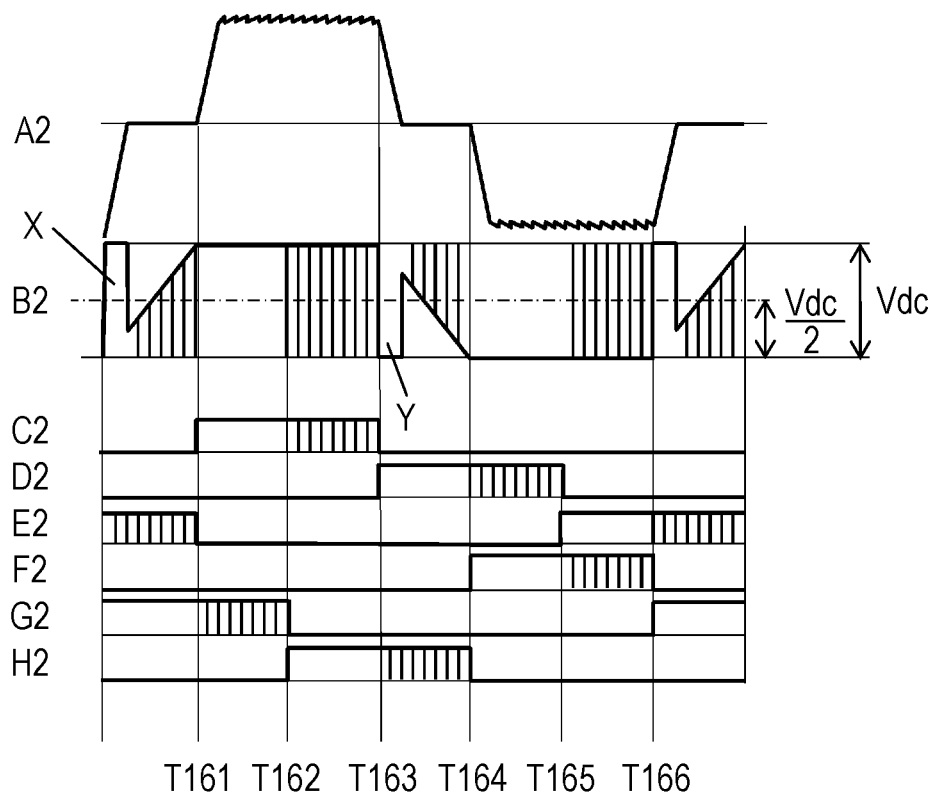
FIG. 16 is a diagram showing waveforms of respective units of the motor driving device in the fourth exemplary embodiment of the present invention when the motor is driven.
Figure 17:
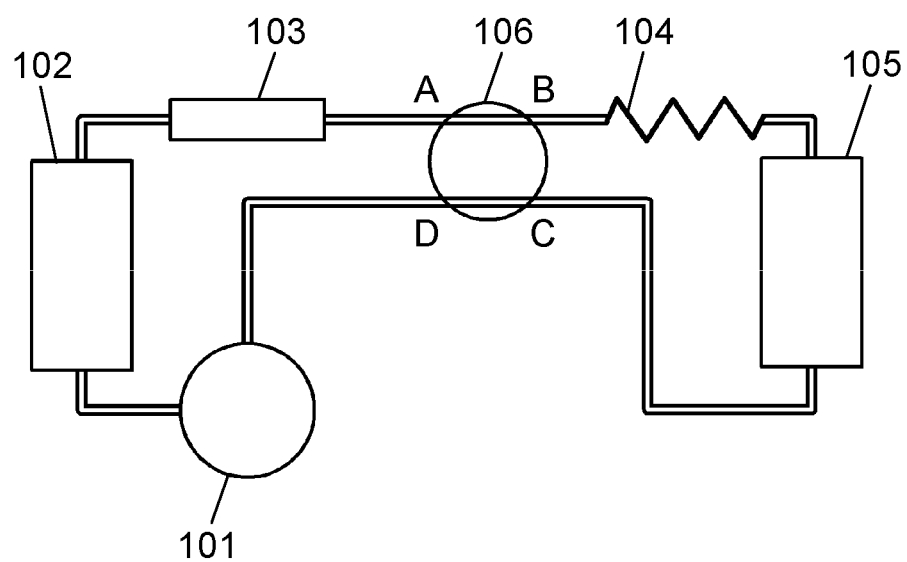
FIG. 17 is a diagram showing a refrigeration cycle in a conventional refrigerator.
Figure 18:
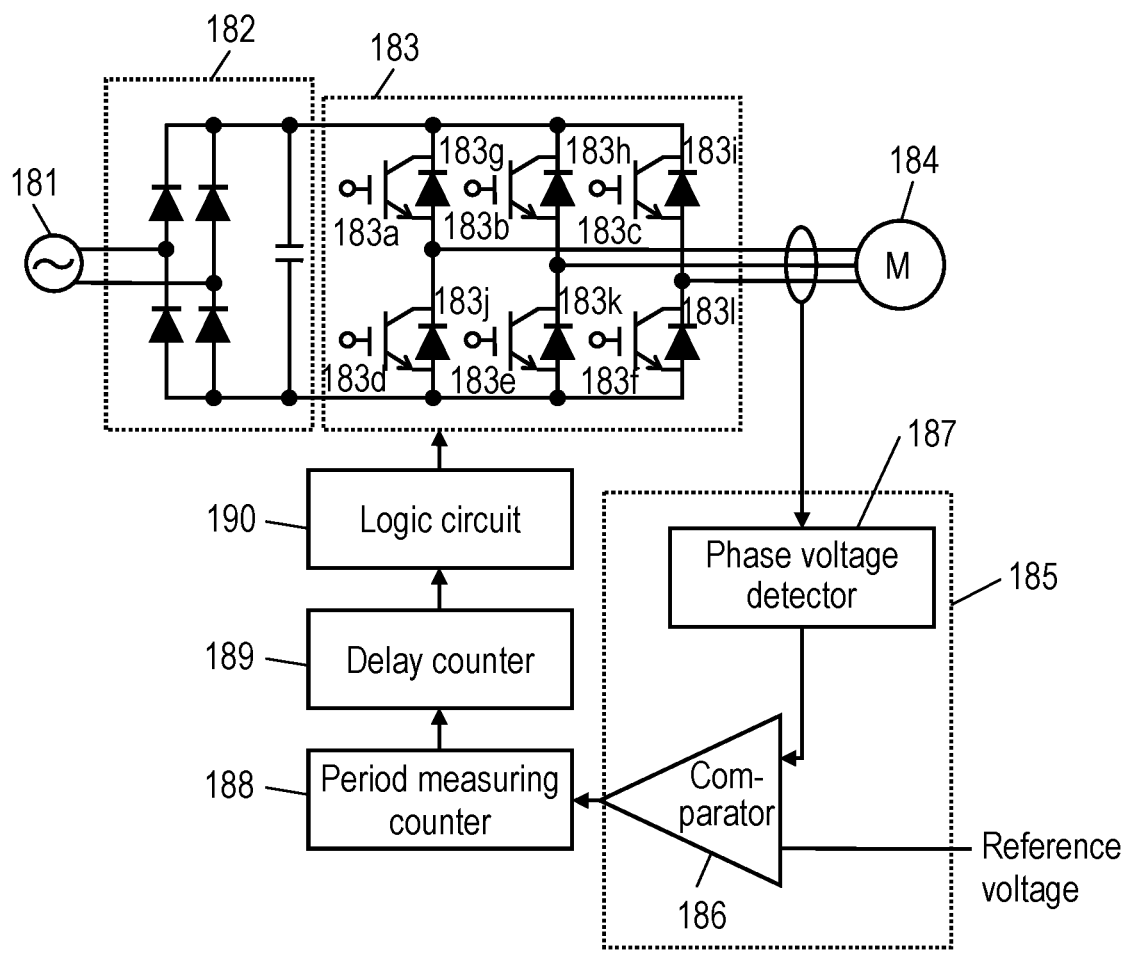
FIG. 18 is a block diagram of a conventional motor driving device.
Figure 19:
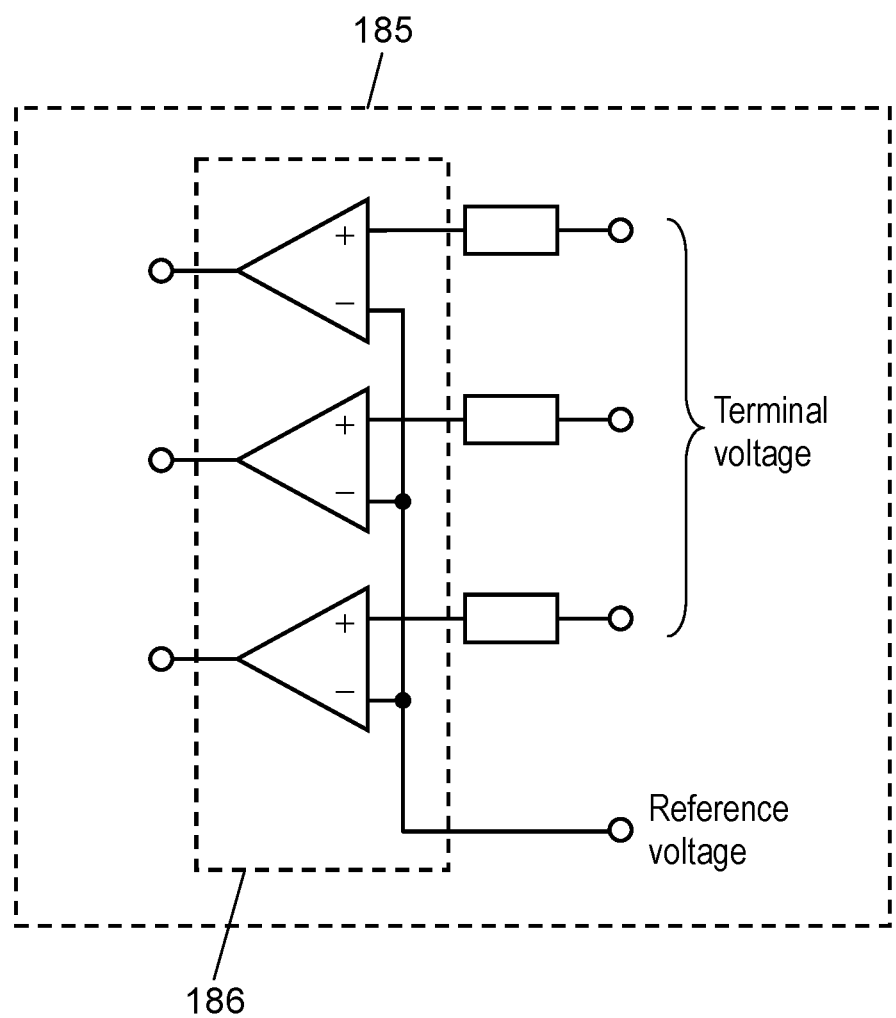
FIG. 19 is a block diagram showing a position detection circuit of the conventional motor driving device.
Figure 20:
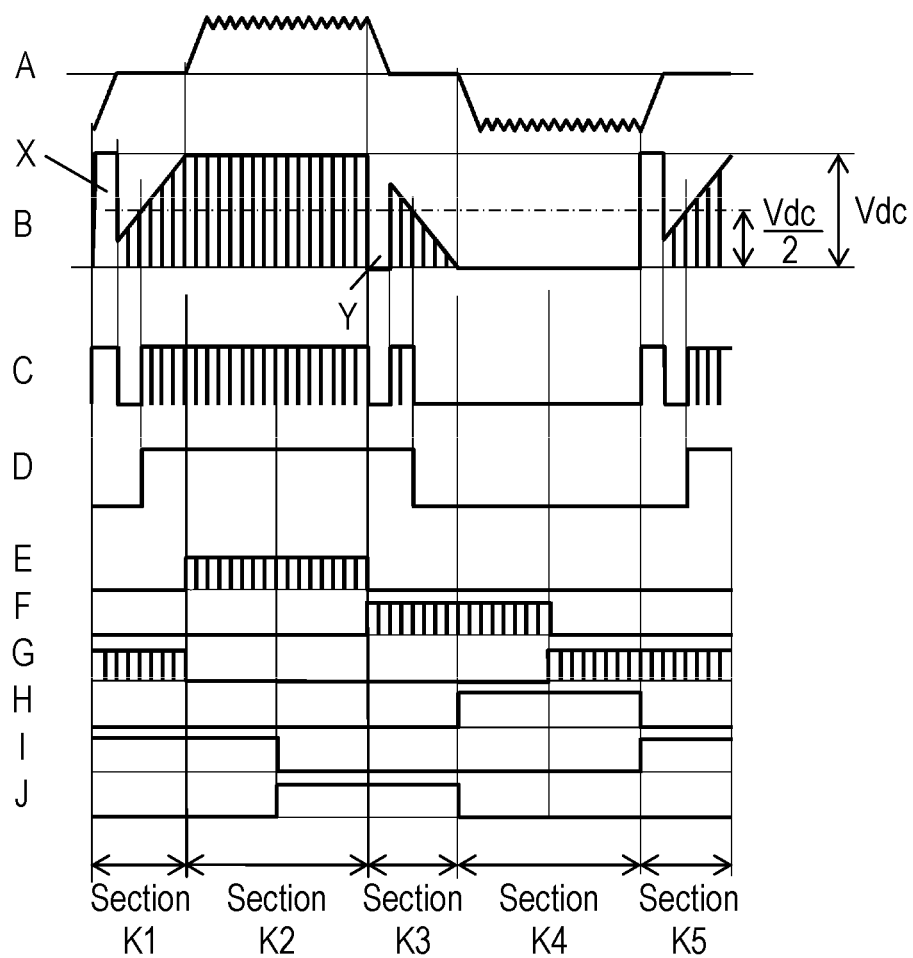
FIG. 20 is a diagram showing waveforms of respective units of the conventional motor driving device at the time of sensorless driving.
Figure 21:
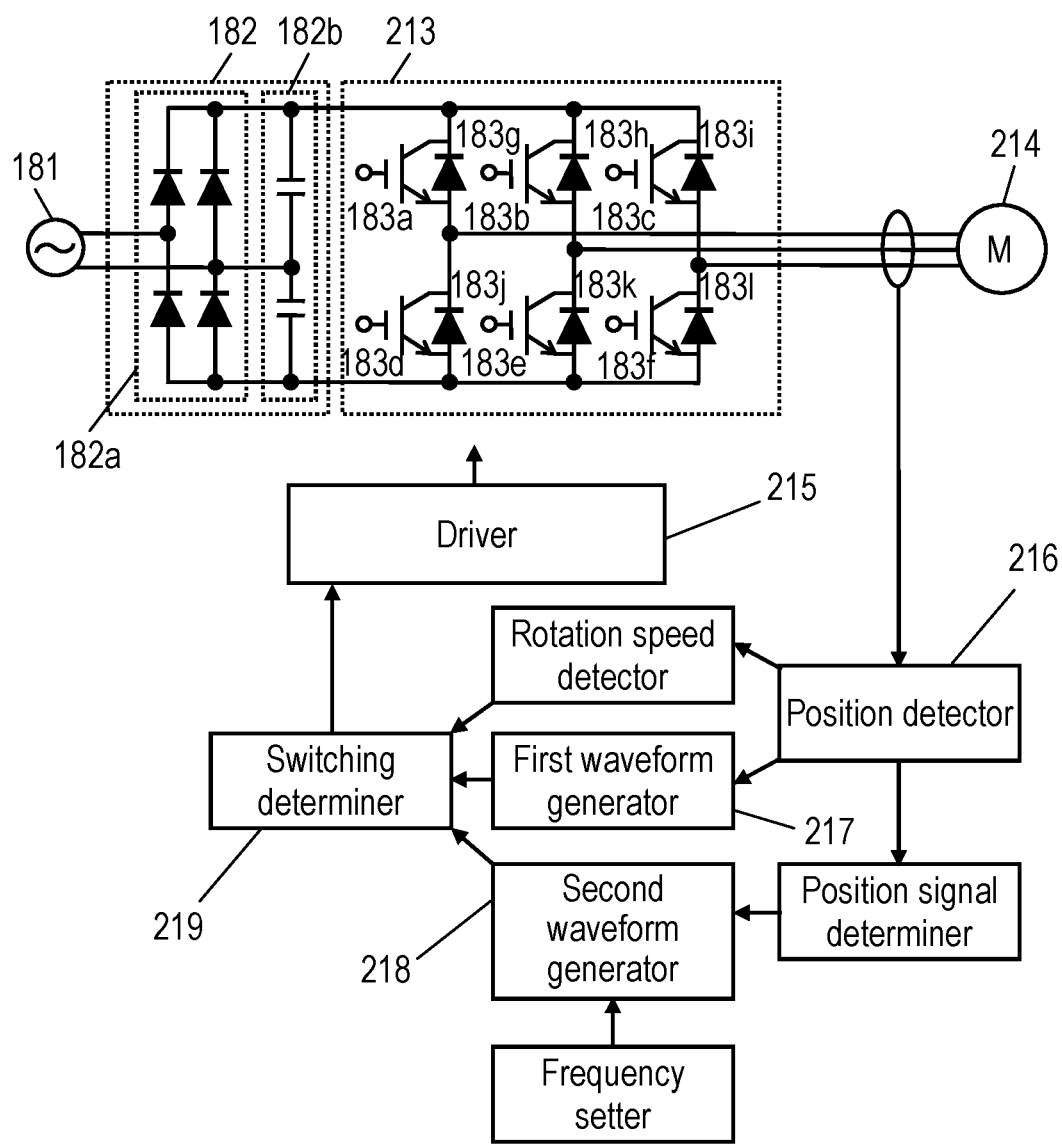
FIG. 21 is a block diagram of the conventional motor driving device.
Figure 22:
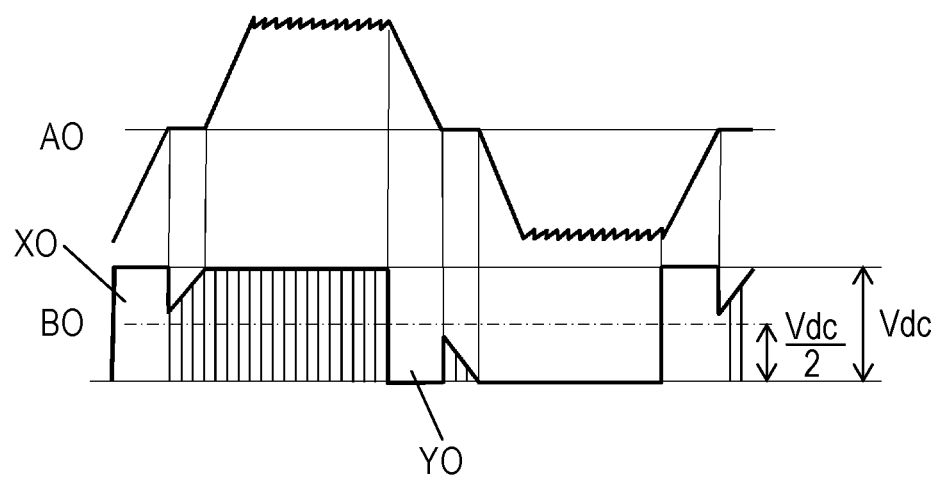
FIG. 22 is a diagram showing waveforms of the respective units of the conventional motor driving device when a large current is generated at the time of the sensorless driving.

FIG. 16 shows waveforms of the respective units at the time of driving by motor driving device 150 of the fourth exemplary embodiment of the present invention. In FIG. 16, waveform A2 is a U-phase winding current of brushless DC motor 124. Waveform B2 is a U-phase terminal voltage of brushless DC motor 124. Waveforms C2 to H2 are drive waveforms of inverter 123 by driver 154. In FIG. 16, timings T161 to T166 show commutation timings at which such energized windings of brushless DC motor 124 are to be switched.

In describing the operations of PWM phase setter 152, commutation timing T163 will be described. In a section between commutation timing T162 and commutation timing T163 (hereinafter, this section is referred to as section T162-T163), switching element 123a performs a chopping operation following PWM control, and in a state in which switching element 123f continues to be energized, the motor current flows sequentially from switching element 123a through the U-phase winding and the W-phase winding to switching element 123f. At commutation timing T163, switching element 123a is turned off, and switching element 123b is turned on. At the same time, PWM phase setter 152 selects switching element 123f (that is, a W-phase low voltage-side connection element), which has been continuously energized in section T162-T163, as such a phase to be subjected to PWM chopping. In this way, in section T163-T164 after the commutation, in a state in which switching element 123b is continuously energized, switching element 123f performs the chopping operation following the PWM, and the motor current flows sequentially from switching element 123b through the V-phase winding and the W-phase winding to switching element 123f.

Next, the flow of the current at the commutation timing will be described with reference to FIGS. 15 and 16 and to FIGS. 14A to 14D used in the third exemplary embodiment.

As described in the third exemplary embodiment, each of FIGS. 14A to 14D is a diagram showing such a route through which the current flows according to the states of switching elements 123a to 123f. In section T162-T163 in FIG. 16, as shown in FIG. 14A, switching element 123a and switching element 123f are in the ON state, the current flows in a direction of an arrow shown in FIG. 14A, and brushless DC motor 124 is in the power running state. At commutation timing T163, at the same time when switching element 123a is turned off, switching element 123f is subjected to chopping control following PWM control. Switching element 123a is turned off, whereby the energy of the U-phase winding is released. However, with regard to the route through which the energy is released, when switching element 123f is in the ON state by the chopping by PWM control, the energy is gradually released at a reflux route shown in FIG. 14B, and when switching element 123f is turned off, the energy returns to the capacitor on the power source side in such a regenerative mode as shown in FIG. 14C. A release time of the winding energy is faster in the case of energy release by charging the capacitor with regenerative energy than in the case of energy consumption in the reflux mode. Therefore, in this exemplary embodiment, with regard to the release of the winding energy, the winding energy is released in the regenerative mode as well as the reflux mode, so that the current of the winding due to the commutation is turned off in a short time.

As described above, PWM phase setter 152 selects the switching element of the phase of the winding, which continues to be energized even after the commutation, among the windings energized immediately before the commutation, as the phase (element) to be subjected to PWM control. As described at commutation timing T163 described above, the switching element (that is, the switching element 123f) in the phase (that is, the W-phase (low-voltage side)) of the winding, which continues to be energized even after the commutation, among the windings (that is, the U-phase winding and the W-phase winding) energized immediately before the commutation is turned on or off by PWM control.

In this way, the energy stored in the winding to which the energization is interrupted by the commutation is returned to the power source side (that is, the smoother 122b) as regenerative energy.

As described above, the switching element is selected by the PWM control, whereby the current of the winding to which the energization is interrupted quickly becomes zero even at the time of driving with a large current by high torque driving at the time of the starting, and so on. Therefore, the zero-cross point of the induced voltage can be reliably detected without being covered with the spike voltage, and it is possible to accurately detect the magnetic pole position of the rotor. In this way, an increase of the drive torque at the time of starting is realized, and the starting performance of the brushless DC motor can be enhanced.

Moreover, it is unnecessary to add a special output pattern of the switching element of the inverter in order to release the winding energy during the commutation, and therefore, the increase of the drive torque and the enhancement of the starting performance can be achieved by an extremely simple method.

A description will be made of operations of motor driving device 150 in this exemplary embodiment and of refrigerator 149 mounted with a driving device of a compressor using motor driving device 150. This exemplary embodiment will be described while taking the refrigerator as an example; however, can also be applied to a freezer or the like.

In FIG. 15, compression element 144 is connected to the shaft of the rotor of brushless DC motor 124, and sucks, compresses, and discharges the refrigerant gas. Brushless DC motor 124 and compression element 144 are housed in the same hermetically sealed container to constitute compressor 145. Such a refrigeration air conditioning system is composed, in which the discharge gas compressed by compressor 145 passes through condenser 146, decompressor 147 and evaporator 148 and returns to compressor 145. Heat is radiated in condenser 146, and heat is absorbed in evaporator 148, and accordingly, cooling and heating can be performed. Note that blowers or the like may be provided for condenser 146 and evaporator 148 according to needs, thereby further promoting the heat exchange. Moreover, in this exemplary embodiment, the refrigeration air conditioning system is used as a refrigeration cycle of refrigerator 149.

In the refrigeration cycle of refrigerator 149, capillary tubes are frequently used for decompressor 147. Since an inner tube diameter of the capillary tubes is extremely small, it takes time to balance the pressures of the suction side and discharge side of compressor 145 when compressor 145 is stopped. Hence, when compressor 145 is stopped due to an instantaneous power failure or the like at the time when compressor 145 is driven, it is necessary to restart compressor 145 promptly from a state in which the pressure difference between the suction side and discharge side of compressor 145 is large.

Large starting torque is required to start compressor 145 in a state in which the pressure balance is not achieved, and this makes it difficult to start compressor 145. However, even in a state in which the pressure difference between the suction side and the discharge side is large, compressor 145 can be stably started by using motor driving device 150 of this exemplary embodiment for driving compressor 145.

With such a configuration, even when compressor 145 is temporarily stopped due to an occurrence of an instantaneous power failure or the like, it is unnecessary to wait for the start-up until the pressure balance of compressor 145 is balanced at the time of recovery from the power failure, and compressor 145 can be promptly restarted. Therefore, the increase in the internal temperature of refrigerator 149 can be suppressed.

Refrigerant flow rate adjuster 135 opens and shuts off the refrigerant flow path between condenser 146 and evaporator 148 of the refrigeration cycle. In this exemplary embodiment, refrigerant flow rate adjuster 135 is installed between condenser 146 and decompressor 147, but may be installed between decompressor 147 and evaporator 148.

Here, operations of refrigerant flow rate adjuster 135 will be described. Refrigerant flow rate adjuster 135 operates in conjunction with the operation or stoppage of compressor 145. Refrigerant flow rate adjuster 135 is configured to open the refrigerant flow path during the operation of compressor 145, and to close the refrigerant flow path during the stoppage of compressor 145. That is, when there is an instruction to drive brushless DC motor 124 (that is, when a commanded speed is not zero), then in order to cool the inside of refrigerator 149, the refrigerant flow path is opened by refrigerant flow rate adjuster 135 such that the refrigerant can be circulated in the refrigeration cycle by the operation of compressor 145. When compressor 145 is stopped (that is, when a stop instruction is issued to brushless DC motor 124), the refrigerant flow path is closed by refrigerant flow rate adjuster 135, and the flow of the refrigerant between condenser 146 and evaporator 148 is shut off.

In the refrigeration cycle of refrigerator 149, condenser 146 is connected to the discharge (high pressure) side of compressor 145, and evaporator 148 is connected to the suction (low pressure) side of compressor 145. Therefore, during the operation of compressor 145, a pressure difference is generated between condenser 146 and evaporator 148. In order to balance the pressures of both of condenser 146 and evaporator 148 after compressor 145 stops, high-temperature and high-pressure gas refrigerant of condenser 146 flows into evaporator 148 through decompressor 147, and is condensed and liquefied in the inside of evaporator 148.

That is, such a high-temperature gas refrigerant flows into evaporator 148 installed in refrigerator 149 in a cooled state, and there, heat is exchanged (thermal energy is released). This results in a thermal load of refrigerator 149, which is therefore a reason for increase of power consumption of refrigerator 149.

Meanwhile, this exemplary embodiment is configured such that, when compressor 145 is stopped, the high-temperature and high-pressure gas from the side of condenser 146 does not flow into evaporator 148 in such a manner that the refrigerant flow path is closed by refrigerant flow rate adjuster 135. In this way, the energy saving performance of the refrigeration cycle using compressor 145 and of refrigerator 149 is enhanced.

Moreover, when compressor 145 is started from a state in which the pressure on the suction side of compressor 145 and the pressure on the discharge side of compressor 145 are balanced, then a loss of energy in the refrigeration cycle occurs during the following period after the start-up. In the period, the pressure on the side of condenser 146 is lowered to a predetermined pressure, the pressure on the discharge side is raised to a predetermined pressure, and compressor 145 returns to such a stable pressure state during the operation.

Meanwhile, in this exemplary embodiment, when compressor 145 is stopped, the refrigerant flow path is closed by refrigerant flow rate adjuster 135, and the high pressure side (discharge side) and suction side (low pressure side) of compressor 145 are divided from each other. Accordingly, compressor 145 has a pressure difference between the discharge side and the suction side, which is equivalent to that during the operation, even while compressor 145 is being stopped. In addition, refrigerator 149 of this exemplary embodiment is configured such that compressor 145 is restarted while the pressure on the suction side and the pressure on the discharge side in compressor 145 remain equivalent to those in the operating state of compressor 145.

Extremely large starting torque is required to start compressor 145 in such a state in which the pressure difference is generated between the suction side and discharge side of compressor 145 in comparison with the start-up from a state in which the pressure on the suction side and the pressure on the discharge side are balanced. However, in this exemplary embodiment, large starting torque can be generated by using motor driving device 150 for driving compressor 145. Hence, compressor 145 can be started stably and smoothly even if compressor 145 is started in such a state in which a large pressure difference is generated between the suction side and discharge side of compressor 145. Hence, in a short time after being started, compressor 145 can be returned to the stable pressure state during the operation, the energy loss in the refrigeration cycle at the time of starting can be reduced, and the power consumption of refrigerator 149 can be reduced.

As described above, motor driving device 30 of the first exemplary embodiment of the present invention includes: brushless DC motor 5 that drives the load that fluctuates during one rotation; and driver 9 that applies a voltage to brushless DC motor 5 and drives brushless DC motor 5. Motor driving device 30 of this exemplary embodiment of the present invention includes speed accelerator 8 that determines the voltage to be applied by driver 9 so as to accelerate brushless DC motor 5 such that the speed change rate of brushless DC motor 5 within one rotation from the start with respect to the speed at the next one rotation remains within the predetermined value or less. With such a configuration, since the speed has a square effect on the load (since the speed change rate is proportional to the square of the speed relative to the load), the speed change in brushless DC motor 5 can be suppressed with a small increase in speed with respect to the increase in load, and the vibrations of brushless DC motor 5 can be reduced. With such a configuration, even in a state in which the load torque fluctuations are large, brushless DC motor 5 can be started stably.

Moreover, in motor driving device 30 of the first exemplary embodiment of the present invention, speed accelerator 8 may be configured to accelerate brushless DC motor 5 such that the speed change rate of the speed within one rotation from the start of brushless DC motor 5 with respect to the speed of the next one rotation remains within the predetermined value or less under the condition calculated from the maximum load change during one rotation of brushless DC motor 5. With such a configuration, motor driving device 30 is capable of being started under the condition where it is most difficult to make the start-up in the load driven by brushless DC motor 5, and can be stably started under all the required conditions.

Moreover, motor driving device 30 of the first exemplary embodiment of the present invention may include position detector 6 that detects the magnetic pole position of brushless DC motor 5. In this case, in motor driving device 30, in a state of performing positioning of flowing a current to a specific phase of brushless DC motor 5 before the start of motor driving device 30, and flowing a current to a phase advanced by 90 degrees or more from the phase positioned after the lapse of a predetermined time, driver 9 is configured to acquire the position information of position detector 6, and to start to drive motor driving device 30. With such a configuration, driving is performed according to the magnetic pole position of brushless DC motor 5, and therefore, even when the load fluctuates during one rotation and the speed greatly changes, motor driving device 30 can be stably driven.

Motor driving device 30 of the first exemplary embodiment of the present invention may be configured as a drive device that drives compressor 17. By being driven by motor driving device 30, compressor 17 can be stably started.

Refrigerator 22 of the first exemplary embodiment of the present invention includes compressor 17 driven by motor driving device 30, and is configured to start in a state in which a pressure difference remains between the suction side and discharge side of compressor 17. This configuration allows motor driving device 30 to start even in a state in which there is a pressure difference between the suction side and discharge side of compressor 17, thereby making it possible to reduce an energy loss in the refrigeration cycle without raising the temperature of evaporator 21 with a simple system configuration at low cost.

Moreover, refrigerator 22 of the first exemplary embodiment of the present invention may be configured such that the pressure difference between the suction side and discharge side of compressor 17 is larger than at least 0.05 MPa. This configuration can reduce an energy loss in a refrigeration cycle while reducing a progress of deterioration due to an increase in vibration and maintaining reliability of compressor 17.

Moreover, motor driving device 82 of the second exemplary embodiment of the present invention includes: brushless DC motor 5 that drives the varying load; speed controller 78 that determines the voltage to be applied to brushless DC motor 5 and adjusts the speed of brushless DC motor 5; and current detector 79 that detects the current flowing through brushless DC motor 5. Furthermore, motor driving device 82 includes: applied voltage changer 80 that reduces the applied voltage, which is determined by speed controller 78, when the current detected by current detector 79 is larger than the first threshold value; and driver 81 that drives brushless DC motor 5 with the applied voltage determined by applied voltage changer 80. With such a configuration, the current rise is suppressed, and brushless DC motor 5 can be driven. This current rise is caused by that the increase in the load reduces the speed and induced voltage of brushless DC motor 5 to increase the difference between the induced voltage and the applied voltage. Therefore, motor driving device 82 can be started without using the four-way valve or the like even in a state in which there is a pressure difference. Moreover, it is possible to achieve energy saving by the use of a high-efficiency motor with a small demagnetization current and to achieve a reduction in cost by the use of an element with a small current rating.

Motor driving device 82 of the second exemplary embodiment of the present invention may be configured such that, when the current detected by current detector 79 is smaller than the second threshold value, applied voltage changer 80 raises the voltage to an upper limit of the applied voltage determined by speed controller 78. With such a configuration, in the section in which the required torque is small and the speed is slow, excessive output torque is suppressed, whereas the output torque is increased in the section in which the torque is insufficient and the speed is high. In this way, the motor driving device can be started while reducing the change in speed and the vibration even under the condition where the load torque fluctuations are large.

Motor driving device 82 of the second exemplary embodiment of the present invention may be configured such that driver 81 performs PWM control to adjust the voltage to be applied to brushless DC motor 5, that speed controller 78 determines the ON ratio of the PWM in order to determine the voltage to be applied, and that applied voltage changer 80 reduces the ON ratio of the PWM determined by speed controller 78 in order to reduce the voltage to be applied. With such a configuration, with a simple control, the motor driving device can be started even in a state in which there is a large fluctuation in the load torque, and an inexpensive motor driving device can be provided.

Motor driving device 82 of the second exemplary embodiment of the present invention may be configured such that, when applied voltage changer 80 reduces the PWM ON ratio, at least a period for turning off all the energization is provided. With such a configuration, brushless DC motor 5 is brought into a regenerative state, and the reduction rate of the current becomes larger than that in the reflux state. Therefore, it is possible to suppress the current more reliably.

Motor driving device 82 of the second exemplary embodiment of the present invention may be configured as a driving device of compressor 17, and brushless DC motor 5 may be configured to drive the compression element of compressor 17. With such a configuration, motor driving device 82 can be started even in a state in which the pressure difference remains in compressor 17 and there is a large load torque fluctuation from the start-up. Accordingly, an inexpensive system that can be started without monitoring the state of compressor 17 can be configured.

Refrigerator 22 of the second exemplary embodiment of the present invention may include compressor 17 for which motor driving device 82 is used, and may be configured to be started in a state in which the pressure difference remains between the suction side and discharge side of compressor 17. With such a configuration, compressor 17 can be started even in a state in which there is a pressure difference between the suction side and discharge side of compressor 17, and refrigerator 22 can be started without waiting for the temperature rise of evaporator 21 at low cost with a simple system configuration. In this way, the energy loss in the refrigeration cycle can be reduced. Furthermore, even if a power failure occurs during the operation of compressor 17 and power recovery is achieved before the pressures on the suction side and discharge side of compressor 17 are balanced, it is possible to immediately start the operation of compressor 17. In this way, a cooling operation can be performed even in a situation where circumstances of power sources are so poor that the power fails frequently.

Moreover, refrigerator 22 of the second exemplary embodiment of the present invention may be configured such that the pressure difference between the suction side and discharge side of compressor 17 is equal to or larger than at least 0.05 MPa. This configuration can reduce the energy loss in the refrigeration cycle while reducing the progress of deterioration due to the increase in vibration and maintaining the reliability of compressor 17.

Moreover, motor driving device 120 of the third exemplary embodiment of the present invention includes: rectifying/smoothing circuit 122 composed of rectifier 122a that rectifies an AC voltage and smoother 122b made of the capacitor that converts the output voltage of rectifier 122a into a stable DC voltage; and brushless DC motor 124 composed of the rotor having the permanent magnet and the stator having the three-phase winding. Furthermore, motor driving device 120 includes: inverter 123 in which six switching elements 123a to 123f are connected to one another in a three-phase bridge configuration, the inverter receiving the output of rectifier 122a and supplying power to the three-phase winding; and position detector 126 that detects the rotational position of the rotor. Moreover, motor driving device 120 includes: speed detector 127 that detects the speed of brushless DC motor 124 based on the signal from position detector 126; energized phase setter 130 that determines the energized phase of the stator winding based on the detected rotational position and driving speed of the rotor; and drive waveform generator 131 that generates the drive waveform of inverter 123. Motor driving device 120 generates the drive waveform of inverter 123 such that, when the energized winding of brushless DC motor 124 is switched, a current for charging the capacitor of smoother 122b flows from the winding to which the supply of power is interrupted. With such a configuration, when the energized phase of the winding of brushless DC motor 124 is switched, the energy stored in the winding to which the supply of power is interrupted returns as regenerative energy to the power source side. Therefore, the current of the motor winding to which the energization is interrupted can be reduced to zero in a short time. In this way, the magnetic pole position of the motor rotor can be reliably detected from the zero-cross point of the motor induced voltage that appears in the motor terminal voltage. Therefore, the starting performance of brushless DC motor 124 can be enhanced.

Furthermore, motor driving device 120 of the third exemplary embodiment of the present invention may be configured as a driving device of compressor 145. In this case, compressor 145 is driven by motor driving device 120. With such a configuration, when the compressor is stopped due to a power failure or the like, even in a state in which large starting torque is required due to the pressure difference between the suction side and discharge side of compressor 145, compressor 145 can be restarted promptly. Therefore, a stopping period of compressor 145 can be shortened.

Moreover, refrigerator 149 in the third exemplary embodiment of the present invention includes: condenser 146 that condenses the high-temperature and high-pressure gas refrigerant compressed by compressor 145; decompressor 147 that decreases the pressure of the liquid refrigerant liquefied by condenser 146; and evaporator 148 that evaporates the liquid refrigerant whose pressure is decreased by decompressor 147. Furthermore, refrigerator 149 includes refrigerant flow rate adjuster 135 that opens and shuts off the refrigerant flow path between condenser 146 and evaporator 148. Moreover, refrigerator 149 is configured such that, while compressor 145 is being stopped, the refrigerant flow path between condenser 146 and evaporator 148 is shut off by refrigerant flow rate adjuster 135. Furthermore, the driving device of compressor 145 is composed of motor driving device 120. With such a configuration, while compressor 145 is being stopped, the increase in temperature of condenser 146 due to inflow of the high-temperature refrigerant to the side of condenser 146 can be prevented. In this way, the energy loss of the refrigeration cycle at the time when compressor 145 is restarted can be reduced.

Refrigerator 149 of the third exemplary embodiment of the present invention may be configured such that, when compressor 145 is started from the stopped state, a pressure difference equal to or larger than a predetermined value is added between the suction-side pressure and discharge-side pressure of compressor 145. With such a configuration, even when compressor 145 is restarted, compressor 145 can be started from the substantially same pressure state as while compressor 145 is being driven. In this way, soon after compressor 145 is started, the pressure between the suction side and discharge side of compressor 145 can return to the stable pressure state during the operation of compressor 145. Hence, the energy loss of the refrigeration cycle until compressor 145 returns to the stable pressure state after being started can be reduced to a large extent.

Refrigerator 149 of the third exemplary embodiment of the present invention may include motor driving device 120. Moreover, refrigerator 149 may include compressor 145 driven by motor driving device 120. With such a configuration, even if compressor 145 is controlled to turn on or off in order to adjust the internal temperature of refrigerator 149, then while compressor 145 is being stopped, the increase in the thermal load, which is caused by the inflow of the high-temperature refrigerant in condenser 146 into evaporator 148, can be prevented. Furthermore, the energy loss of the refrigeration cycle until the pressure state at the start-up of compressor 145 returns to the stable pressure during the operation of compressor 145 can be suppressed. Therefore, refrigerator 149 with low power consumption can be provided.

Motor driving device 150 of the fourth exemplary embodiment of the present invention includes: rectifying/smoothing circuit 122 composed of rectifier 122a that rectifies an AC voltage and smoother 122b made of the capacitor that converts the output voltage of rectifier 122a into a stable DC voltage; and brushless DC motor 124 composed of the rotor having the permanent magnet and the stator having the three-phase winding. Furthermore, motor driving device 150 includes: inverter 123 in which six switching elements 123a to 123f are connected to one another in a three-phase bridge configuration, inverter 123 receiving the output of rectifying/smoothing circuit 122 and supplying power to the three-phase winding; position detector 126 that detects the rotational position of the rotor; and speed detector 127 that detects the speed of brushless DC motor 124 from the signal from position detector 126. Moreover, motor driving device 150 includes: energized phase setter 151 that determines the energized phase of the stator winding based on the detected rotational position and driving speed of the rotor; and error detector 128 that detects an error between the driving speed obtained by speed detector 127 and the target speed. Furthermore, motor driving device 150 includes: PWM controller 129 that adjusts the output voltage of inverter 123 by PWM control by ON chopping or OFF chopping of any one of switching elements 123a to 123f of inverter 123 such that the speed of brushless DC motor 124 becomes the target speed; and drive waveform generator 153 that generates the drive waveform of inverter 123. Motor driving device 150 is configured to select the one of switching elements 123a to 123f, which performs the chopping by PWM control, such that a current for charging the capacitor of smoother 122b flows from the winding, to which the supply of power is interrupted, when the energized winding of brushless DC motor 124 is switched. With such a configuration, when the energized phase of the winding of brushless DC motor 124 is switched, the energy stored in the winding to which the supply of power is interrupted returns as regenerative energy to the power source side. Therefore, the current of the motor winding to which the energization is interrupted can be reduced to zero in a short time. In this way, the magnetic pole position of the motor rotor can be reliably detected from the zero-cross point of the motor induced voltage that appears in the motor terminal voltage. Therefore, the starting performance of brushless DC motor can be enhanced.

Motor driving device 150 of the fourth exemplary embodiment of the present invention may be configured as a driving device that drives compressor 145. When being stopped due to a power failure or the like, compressor 145 driven by motor driving device 150 can be promptly restarted even in a state in which large starting torque is required due to the pressure difference between the suction side and discharge side of compressor 145. In this way, the stopping period of compressor 145 can be shortened, and compressor 145 can be stably started.

Refrigerator 149 in the fourth exemplary embodiment of the present invention includes: condenser 146 that condenses the high-temperature and high-pressure gas refrigerant compressed by compressor 145; decompressor 147 that decreases the pressure of the liquid refrigerant liquefied by condenser 146; evaporator 148 that evaporates the liquid refrigerant whose pressure is decreased by decompressor 147; and refrigerant flow rate adjuster 135 that opens and shuts off the refrigerant flow path between condenser 146 and evaporator 148. Refrigerator 149 may be configured such that, while compressor 145 is stopped, the refrigerant flow path between condenser 146 and evaporator 148 is shut off by refrigerant flow rate adjuster 135. With such a configuration, the increase in temperature of condenser 146 due to inflow of the high-temperature refrigerant to the side of condenser 146 while compressor 145 is being stopped can be prevented. In this way, the energy loss of the refrigeration cycle at the time when compressor 145 is restarted can be reduced.

Refrigerator 149 of the fourth exemplary embodiment of the present invention may be configured such that, when compressor 145 is started from the stopped state, a pressure difference equal to or larger than a predetermined value is added between the suction-side pressure and discharge-side pressure of compressor 145. In this way, even when compressor 145 is restarted, compressor 145 can be started from substantially the same pressure state as while compressor 145 is being driven. Therefore, soon after compressor 145 is started, the pressure between the suction side and discharge side of compressor 145 can return to the stable pressure state during the operation of the compressor. Hence, the energy loss of the refrigeration cycle until compressor 145 returns to the stable pressure state after being started can be reduced to a large extent.

Refrigerator 149 of the fourth exemplary embodiment of the present invention may include motor driving device 150, or compressor 145 for which motor driving device 150 is used. With such a configuration, even if compressor 145 is controlled to turn on or off in order to adjust the internal temperature of refrigerator 149, then while compressor 145 is being stopped, the increase in the thermal load, which is caused by the inflow of the high-temperature refrigerant in condenser 146 into the evaporator, can be prevented. Furthermore, the energy loss of the refrigeration cycle until the pressure state at the start-up of compressor 145 returns to the stable pressure during the operation of compressor 145 can be suppressed. Therefore, refrigerator 149 with low power consumption can be provided.

INDUSTRIAL APPLICABILITY

The present invention provides a motor driving device capable of stably starting up even in a state in which load torque fluctuates greatly, the motor driving device having enhanced driving performance at the time of high torque driving and the time of high load driving, and provides a driving device of a compressor and a refrigerator, each of which uses the motor driving device. Hence, the motor driving device of the present invention can be applied not only to the refrigerator but also widely to a freezer, an air conditioner, a heat pump washer dryer, a heat pump water heater, a vending machine, a showcase, and the like.

REFERENCE MARKS IN THE DRAWINGS

1: AC power source (power source)
2: rectifier circuit
3: smoother
4: inverter
5: brushless DC motor
6: position detector
7: speed detector
8: speed accelerator
9: driver
17: compressor
19: condenser
20: decompressor
21: evaporator
22: refrigerator
30: motor driving device
76: position detector
77: speed detector
78: speed controller
79: current detector
80: applied voltage changer
81: driver
82: motor driving device
120: motor driving device
121: AC power source (power supply)
122: rectifying/smoothing circuit
122a: rectifier
122b: smoother
123: inverter
124: brushless DC motor
126: position detector
127: speed detector
128: error detector
129: PWM controller
130: energized phase setter
131: drive waveform generator
132: driver
135: refrigerant flow rate adjuster
144: compression element
145: compressor
146: condenser
147: decompressor
148: evaporator
149: refrigerator
150: motor driving device
151: energized phase setter
152: PWM phase setter
153: drive waveform generator
154: driver

The invention claimed is:

1. A refrigerator comprising:
a compressor; and
a motor driving device used for the compressor, wherein the motor driving device comprises:
a brushless DC motor configured to drive a load that fluctuates during one rotation;
a driver configured to apply a voltage to the brushless DC motor and drive the brushless DC motor;
a position detector configured to detect a magnetic pole position of the brushless DC motor;

a speed detector configured to calculate a current driving speed of the brushless DC motor from the position detected by the position detector; and a speed accelerator configured to determine the voltage to be applied by the driver so as to accelerate the brushless DC motor such that a speed change rate of a speed calculated by the speed detector within one rotation from a start of the brushless DC motor with respect to a speed calculated by the speed detector at next one rotation remains within a predetermined value or less, wherein the compressor is configured to start in a state where a pressure difference remains between a suction side and a discharge side of the compressor.

2. The refrigerator according to claim 1, wherein a pressure difference between the suction side and the discharge side of the compressor is larger than at least 0.05 MPa.

3. The refrigerator according to claim 1, wherein the speed accelerator is configured to accelerate the brushless DC motor such that the speed change rate of the speed detected by the speed detector within one rotation from the start of the brushless DC motor with respect to the speed detected by the speed detector at the next one rotation remains within the predetermined value or less under a condition where a change of the load during one rotation is maximized.

4. The refrigerator according to claim 1, wherein, in a state of performing positioning of flowing a current to a specific phase of the brushless DC motor before start of the motor driving device, and flowing a current to a phase advanced by 90 degrees or more from the phase positioned after a lapse of a predetermined time, the driver is configured to acquire position information of the position detector, and to the start to drive the motor driving device.

* * * * *